US011685296B2

(12) United States Patent
Nowland

(10) Patent No.: US 11,685,296 B2
(45) Date of Patent: Jun. 27, 2023

(54) VEHICLE

(71) Applicant: Yamaha Hatsudoki Kabushiki Kaisha, Shizuoka-ken (JP)

(72) Inventor: Dane Nowland, Newnan, GA (US)

(73) Assignee: YAMAHA HATSUDOKI KABUSHI KI KAI SHA, Shi Zuoka (JP)

( * ) Notice: Subject to any disclaimer, the term of this patent is extended or adjusted under 35 U.S.C. 154(b) by 462 days.

(21) Appl. No.: 16/886,706

(22) Filed: May 28, 2020

(65) Prior Publication Data

US 2020/0290488 A1 Sep. 17, 2020

Related U.S. Application Data

(62) Division of application No. 15/836,926, filed on Dec. 11, 2017, now abandoned.

(60) Provisional application No. 62/434,419, filed on Dec. 15, 2016.

(51) Int. Cl.
| | |
|---|---|
| *B60N 2/06* | (2006.01) |
| *B60N 2/30* | (2006.01) |
| *B60N 2/01* | (2006.01) |
| *B62D 33/02* | (2006.01) |
| *B62D 21/02* | (2006.01) |
| *B60N 2/68* | (2006.01) |
| *B62D 21/12* | (2006.01) |
| *B60N 2/80* | (2018.01) |
| *B62D 27/06* | (2006.01) |

(52) U.S. Cl.
CPC .............. *B60N 2/305* (2013.01); *B60N 2/01* (2013.01); *B60N 2/065* (2013.01); *B60N 2/3022* (2013.01); *B60N 2/688* (2013.01); *B60N 2/80* (2018.02); *B62D 21/02* (2013.01); *B62D 21/12* (2013.01); *B62D 27/06* (2013.01); *B62D 33/02* (2013.01)

(58) Field of Classification Search
CPC .......... B60N 2/01; B60N 2/065; B60N 2/305; B60N 2/3022; B60N 2/688
See application file for complete search history.

(56) References Cited

U.S. PATENT DOCUMENTS

| | | | | |
|---|---|---|---|---|
| 4,311,420 | A * | 1/1982 | Hendricks | B60P 7/0892 410/121 |
| 7,874,606 | B2 * | 1/2011 | Yamamura | B62D 21/08 296/64 |
| 2002/0057007 | A1 * | 5/2002 | Furukawa | B60N 2/0705 297/344.11 |
| 2008/0169674 | A1 * | 7/2008 | Giles | B60P 7/0892 296/183.1 |
| 2009/0322135 | A1 * | 12/2009 | Ehrhard | B60N 2/3065 297/331 |
| 2018/0281960 | A1 * | 10/2018 | Weingart | B64D 11/062 |

(Continued)

FOREIGN PATENT DOCUMENTS

EP 63214 A * 10/1982 ............... B61D 1/04

*Primary Examiner* — Hilary L Gutman
(74) *Attorney, Agent, or Firm* — Hea Law PLLC

(57) ABSTRACT

The vehicle with right and left front seats, a cargo bed located behind the right and left front seats, a guide rail located on the cargo bed, and a rear seat with a seat frame connected to the guide rail and slidable in the front-rear direction along the guide rail. This structure enables the cargo bed to have a sufficient capacity while preventing the vehicle body from increasing in size, and secures freedom in the shape of the rear seat.

20 Claims, 14 Drawing Sheets

(56) References Cited

U.S. PATENT DOCUMENTS

2019/0106063 A1* 4/2019 Briggs .................... B60R 13/01
2020/0324637 A1* 10/2020 Hammond, Jr. ......... B60K 1/04

* cited by examiner

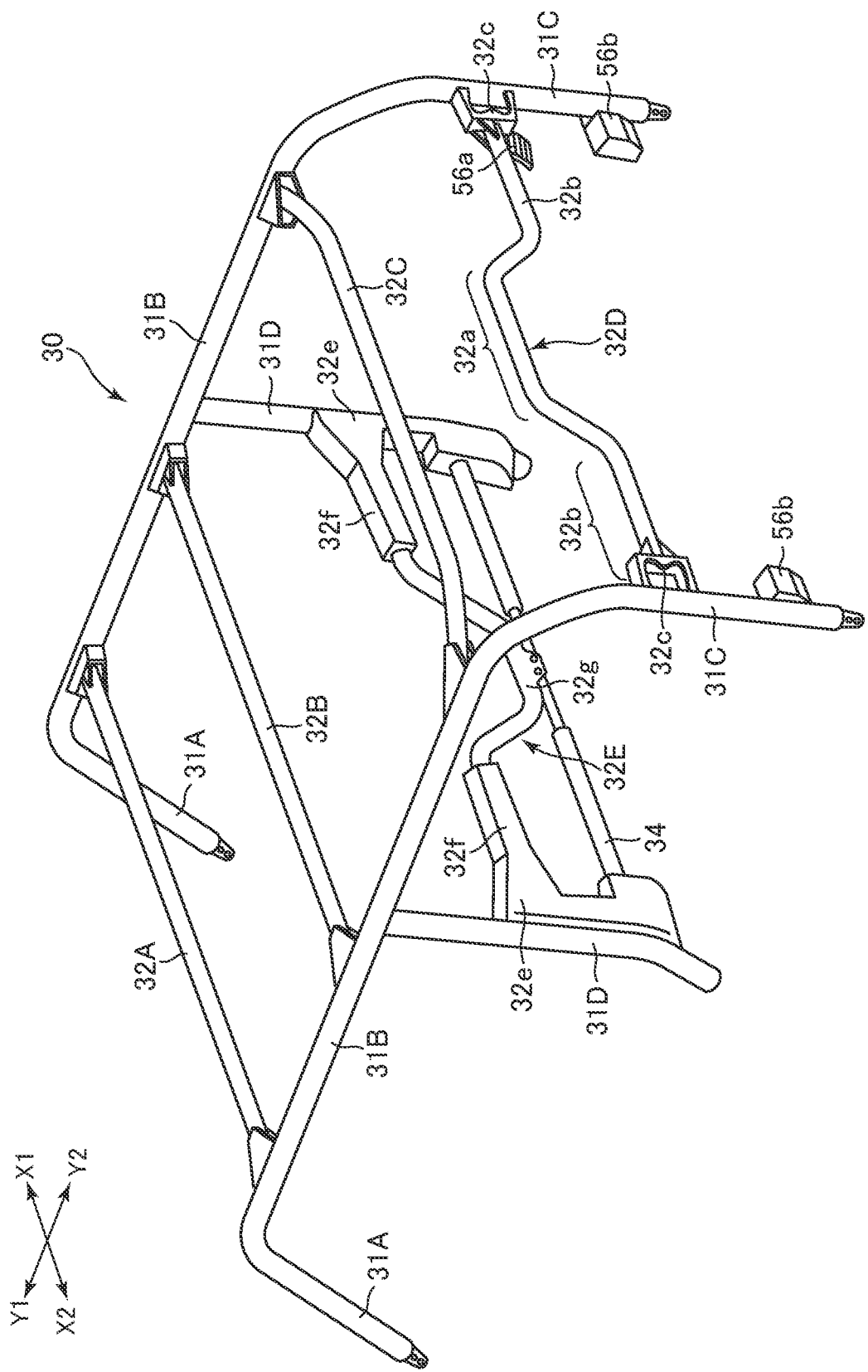

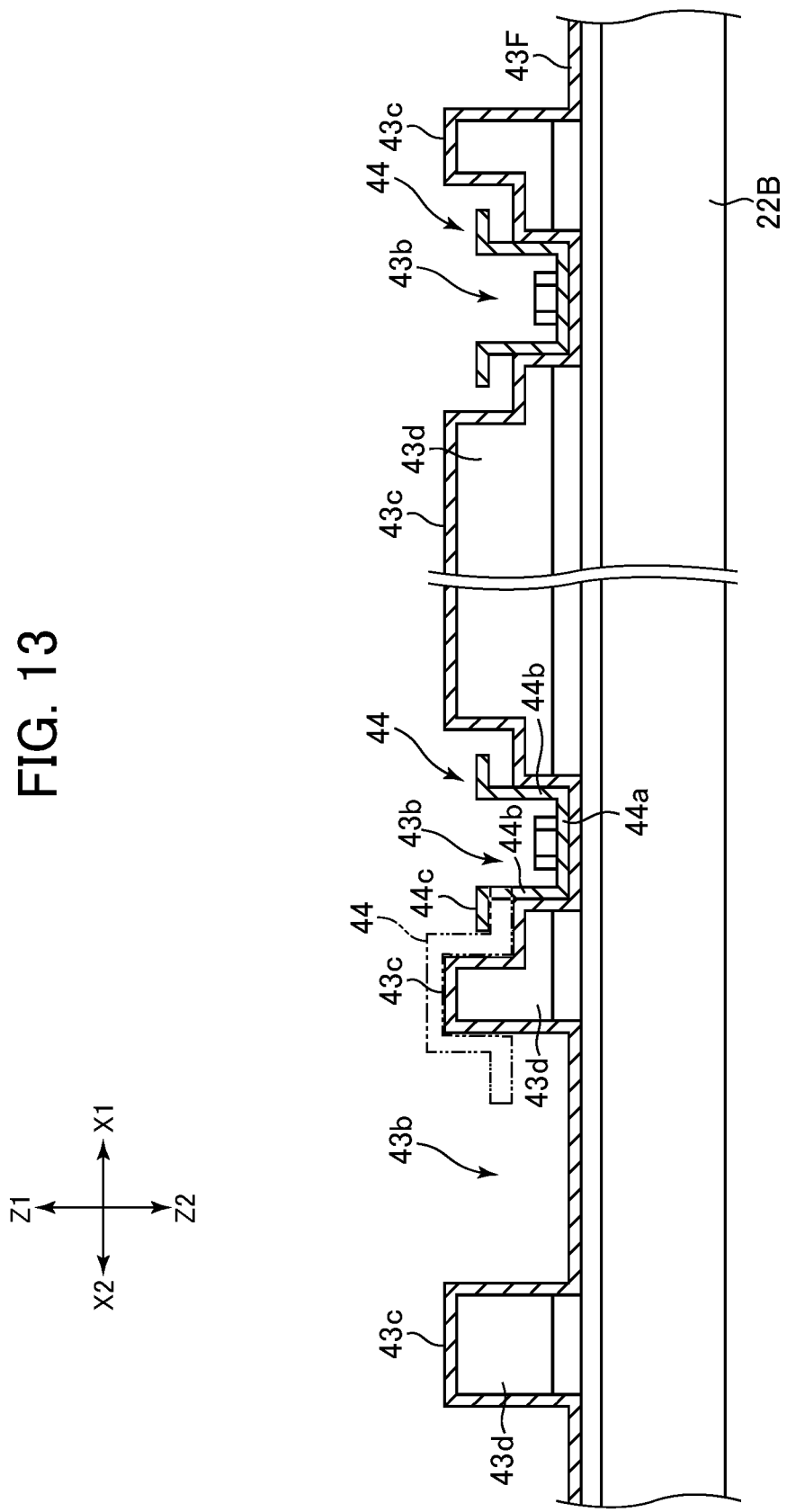

VEHICLE

CROSS-REFERENCE TO RELATED APPLICATION

This application claims priority to and is a Division of U.S. application Ser. No. 15/836,926 filed on Dec. 11, 2017 which is claiming benefit of U.S. provisional patent application 62/434,419 filed on Dec. 15, 2016, the content of which is hereby incorporated by reference into this application.

FIELD OF THE INVENTION

The present specification relates to technologies of four-wheel vehicles.

BACKGROUND OF THE INVENTION

Some vehicles frequently used in rough terrain include right and left front seats, right and left rear seats, and a cargo bed located rearward of the right and left rear seats. U.S. Pat. No. 8,353,534 discloses a vehicle including rear seats that can fold in the forward direction. As the rear seat is folded forward, the rear surface of the seat back (rear surface of a portion for supporting the rider's back) of the rear seat becomes the floor of the cargo bed. According to U.S. Pat. No. 8,353,534, folding the rear seats forward increases the capacity of the cargo bed.

SUMMARY OF THE INVENTION

The structure that allows the rear seats to be folded forward as described in U.S. Pat. No. 8,353,534 requires the seat back to be formed in a rectangular shape in order to employ the seat back as the floor of the cargo bed and thus has a significant restriction on the shape of the rear seat.

An object of the present disclosure is to provide a vehicle that enables the cargo bed to have a sufficient capacity while preventing the vehicle body from increasing in size and securing freedom of the shape of the rear seat.

(1) An embodiment of a vehicle according to the present disclosure comprises: right and left front wheels; right and left rear wheels; a body frame; right and left front seats mounted on the body frame; a cargo bed located rearward of the right and left front seats; a guide rail disposed on the cargo bed; and a rear seat including a seat frame that is attached on the guide rail and is slidable in a front-rear direction along the guide rail. This embodiment enables the cargo bed to have a sufficient capacity while preventing the vehicle body from increasing in size and securing freedom of the shape of the rear seat.

(2) In the embodiment described in (1), the rear seat may include a seat bottom positioned at a bottom of the rear seat and a seat back located on a rear side of the seat bottom, and at least the seat back may be fixed to the seat frame and slidable in the front-rear direction.

(3) In the embodiment described in (2), the seat bottom may be movable independently of the seat back. This structure enables the seat back to have an increased movable range.

(4) In the embodiment described in (3), the seat bottom may be movable to a laid position at which the seat bottom allows a rider to sit thereon; and the seat bottom may be movable to a standing position at which the seat bottom does not allow the rider to sit thereon. This structure enables the seat back to have an increased movable range.

(5) In the embodiment described in (4), when the seat bottom is at the standing position, a seat surface of the seat bottom may face forward. This structure prevents cargo placed in the cargo bed from being in contact with the seat surface of the seat bottom.

(6) In the embodiment described in (1), the rear seat may include a seat bottom positioned at a bottom of the rear seat and a seat back located on a rear side of the seat bottom, and the seat bottom may be located in a space defined forward of the cargo bed in a state where the rear seat does not allow a rider to sit thereon. This structure enables the seat back to have an increased movable range.

(7) In the embodiment described in (3), the seat bottom may be movable around a pivot shaft so that the seat bottom may be placed in the laid position or the standing position. With this structure, the movement of the seat bottom can be easily made.

(8) In the embodiment described in (7), the pivot shaft may be located at a front end of the cargo bed. This structure increases the movable range of the seat back.

(9) In the embodiment described in (3), when the seat bottom is in a laid position allowing a rider to sit thereon, the seat bottom may be located on the guide rail. This structure increases the support strength for the seat bottom.

(10) In the embodiment described in (2), the seat back may include a back rest portion which is a lower portion of the seat back for supporting a rider's back, and a head rest portion which is an upper portion of the seat back for supporting the rider's head, and both of the head rest portion and the back rest portion may be integrally movable in the front-rear direction along the guide rail.

(11) In the embodiment described in (1), the rear seat may be movable to a first state in which the rear seat allows a rider to sit thereon and to a second state in which the rear seat does not allow the rider to sit thereon, and when an area in which the seat bottom is located when the rear seat is in the first state is defined as a seat bottom area, at least a part of the seat back may be located in a front part of the seat bottom area in a state where the rear seat is in the second state of the rear seat. This structure enables the cargo bed to have a sufficient area for loading cargo when the rear seat is in the second state.

(12) In the embodiment described in (1), the rear seat may include a seat bottom position at a bottom of the rear seat and a seat back located on a rear side of the seat bottom, and a cross portion may be located behind the seat back. With this structure, the seat back may be supported by the cross portion when the seat back is in the usable state.

(13) In the embodiment described in (12), the rear seat may be provided with a seat belt mechanism which includes a belt. A guide anchor that guides the belt is attached to the cross portion. This structure eliminates necessity for a dedicated member that supports the guide anchor.

(14) In the embodiment described in (1), the rear seat may be provided with a seat belt mechanism including a belt, a joint provided to the belt, and a buckle for the joint to be connected. The cargo bed may have an accommodating portion that accommodates the buckle. This structure prevents the buckle from being an obstacle to cargo placed on the cargo bed.

(15) In the embodiment described in (14), the accommodating portion may be concave, and the cargo bed may include a lid for closing the accommodating portion. This structure prevents the buckle from being an obstacle to cargo placed on the cargo bed when the rear seat is in the unusable state.

(16) In the embodiment described in (1), the cargo bed may include a cargo bed floor that has a convex portion and a concave portion, each extending in the front-rear direction, and the guide rail may fit into the concave portion or the convex portion. This structure increases the rigidity of the cargo bed floor. Further, this structure prevents the guide rail from being an obstacle to cargo placed in the cargo bed.

(17) In the embodiment described in (14), the concave portion and the convex portion extend rearward beyond the guide rail. This structure increases the rigidity of the rear part of the cargo bed.

(18) The embodiment described in (1) may further comprise a roll cage covering the front seats and the rear seat. The roll cage may include a portion located further rearward than the rear seat.

(19) In the embodiment described in (18), the cargo bed may include a portion located further rearward than the portion of the roll cage.

Other objects and features of this invention will be in part apparent and in part point pointed out hereinafter.

BRIEF DESCRIPTION OF THE DRAWINGS

The following drawings illustrate examples of various components of the invention disclosed herein, and are for illustrative purposes only.

FIG. 5B is a perspective view of an upper frame (roll cage) constituting the vehicle frame.

FIG. 13 is a cross-sectional view taken along the line XIII-XIII indicated in FIG. 10.

DETAILED DESCRIPTION OF THE INVENTION

While the present invention may be embodied in many different forms, several illustrative embodiments are described herein with the understanding that this disclosure is to be considered as providing examples of the principles of the invention and such examples are not intended to limit the invention to the preferred embodiments described herein and/or illustrated herein.

Hereinafter, embodiments according to the present invention will be described. The embodiments disclosed in the present specification should be understood as an example of the invention and the invention is not limited to embodiments described in the following description and in the figures. Other embodiments having advantages that is the same as, or similar to, advantages of the present embodiments are included within the scope of the present invention.

Various techniques and structures are described in this specification. Those may be combined with other techniques and structures described herein. Though the present specification does not describe all possible combinations, any combinations are within the scope of the present invention.

Unless otherwise defined, all terms used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" "comprising" "includes" and "including" when used in this specification, specify the presence of stated features, operations, elements, and/or components, but do not preclude the presence or addition of one or more other features, operations, elements, components, and/or groups thereof.

Figure 1:
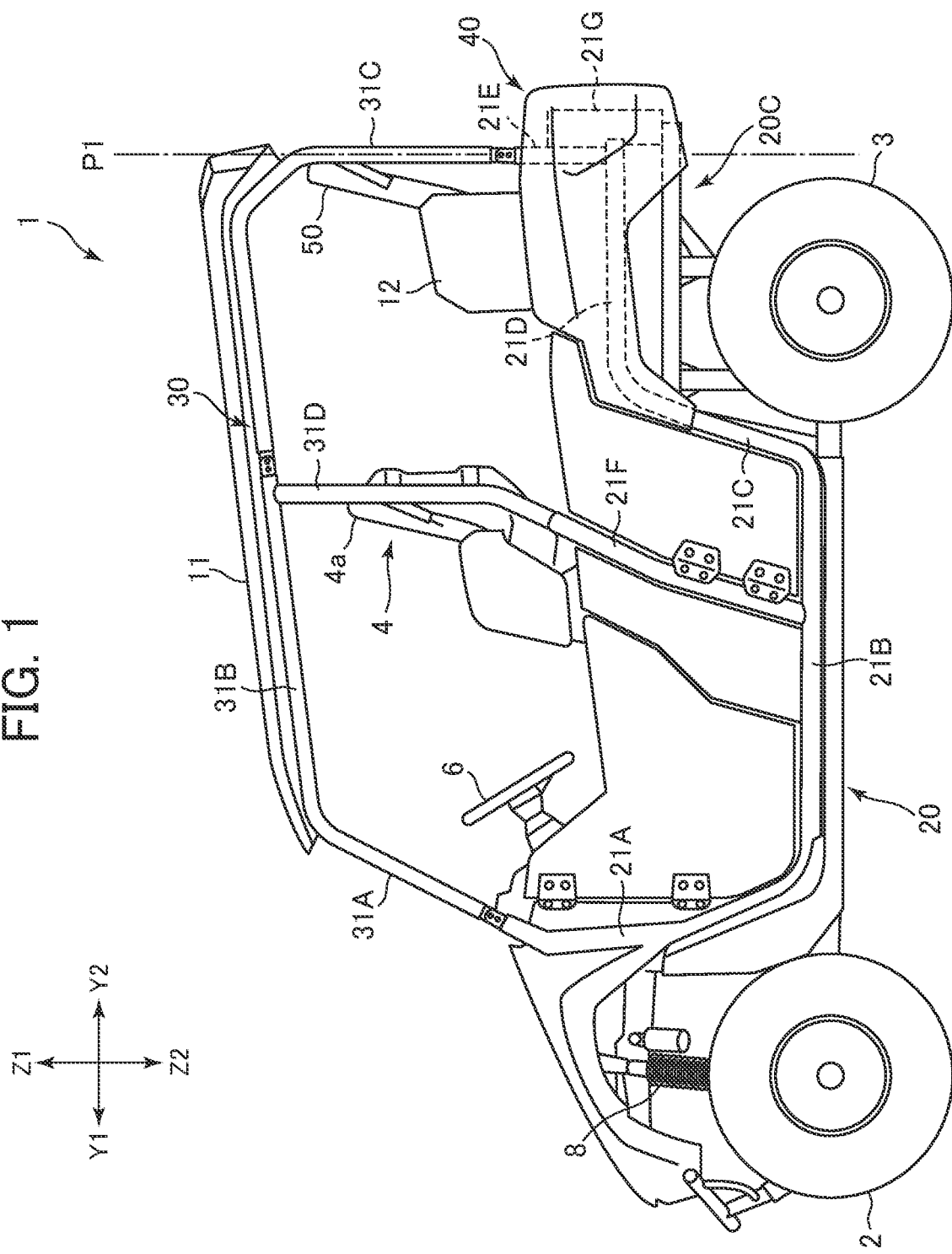
FIG. 1 is a side view showing an example of a vehicle of an embodiment according to the present disclosure.
Figure 2:
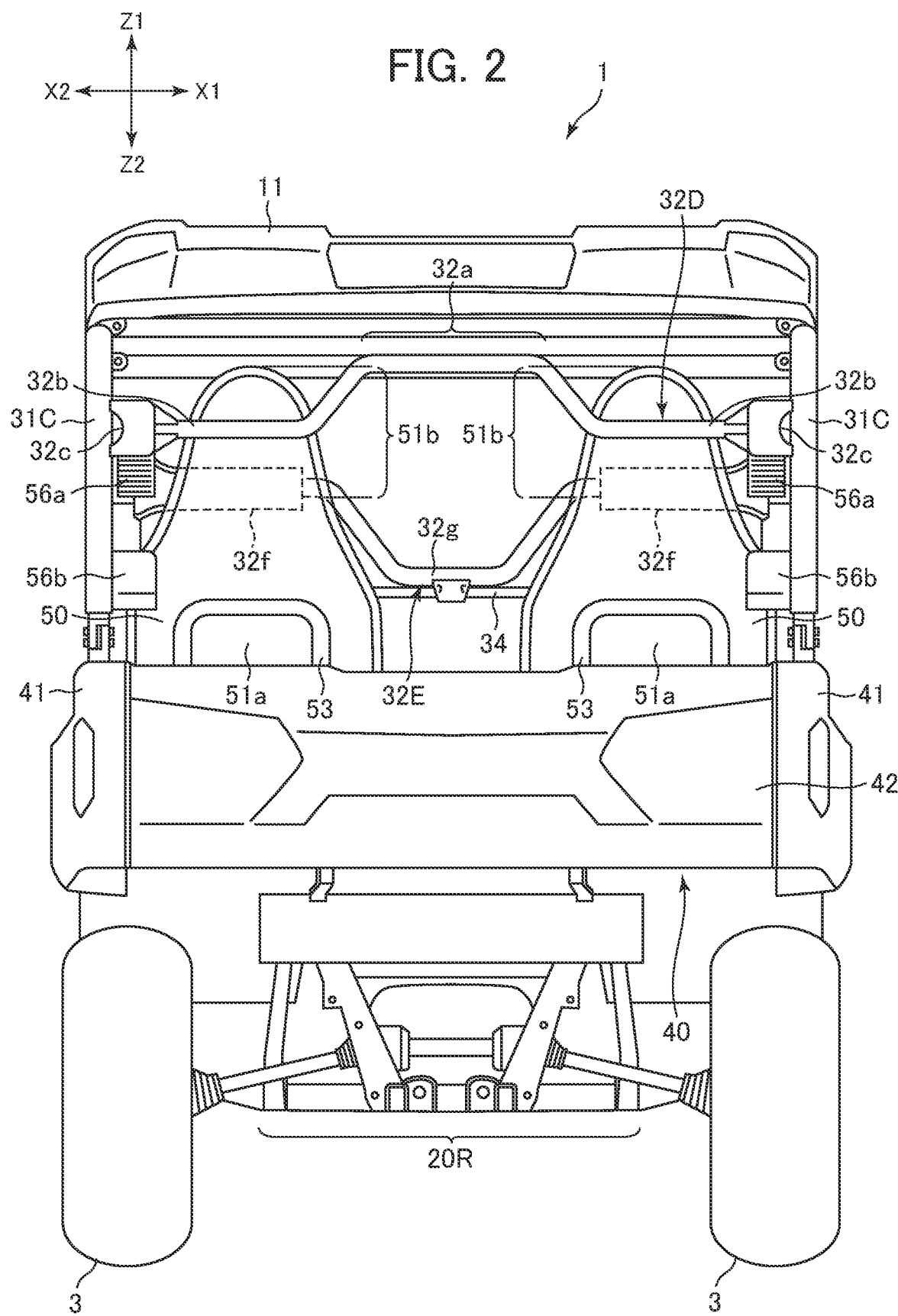
FIG. 2 is a rear view of the vehicle.
Figure 3:
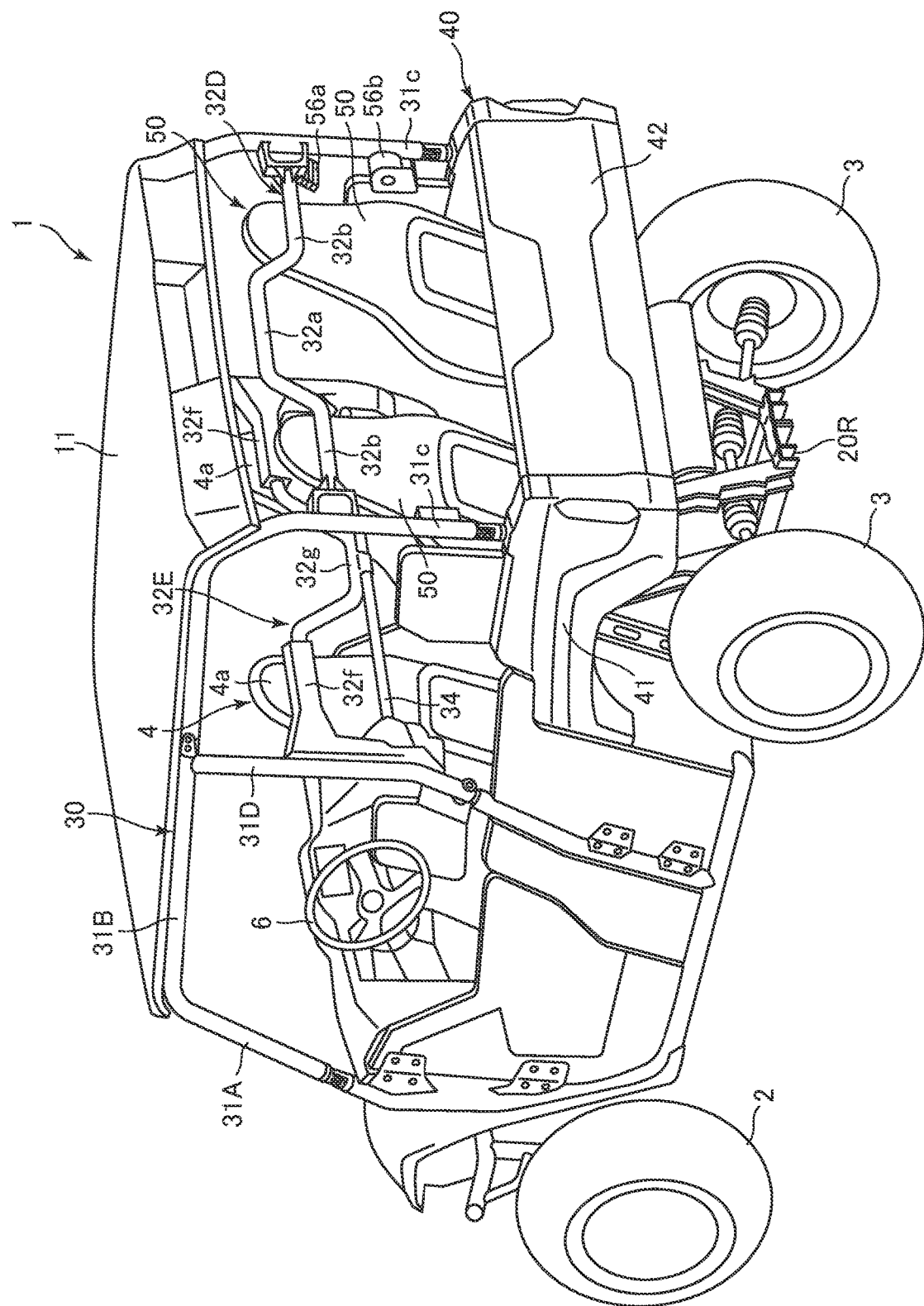
FIG. 3 is a perspective view showing the vehicle frame of the vehicle obliquely viewed from the rear of the vehicle.
Figure 4:
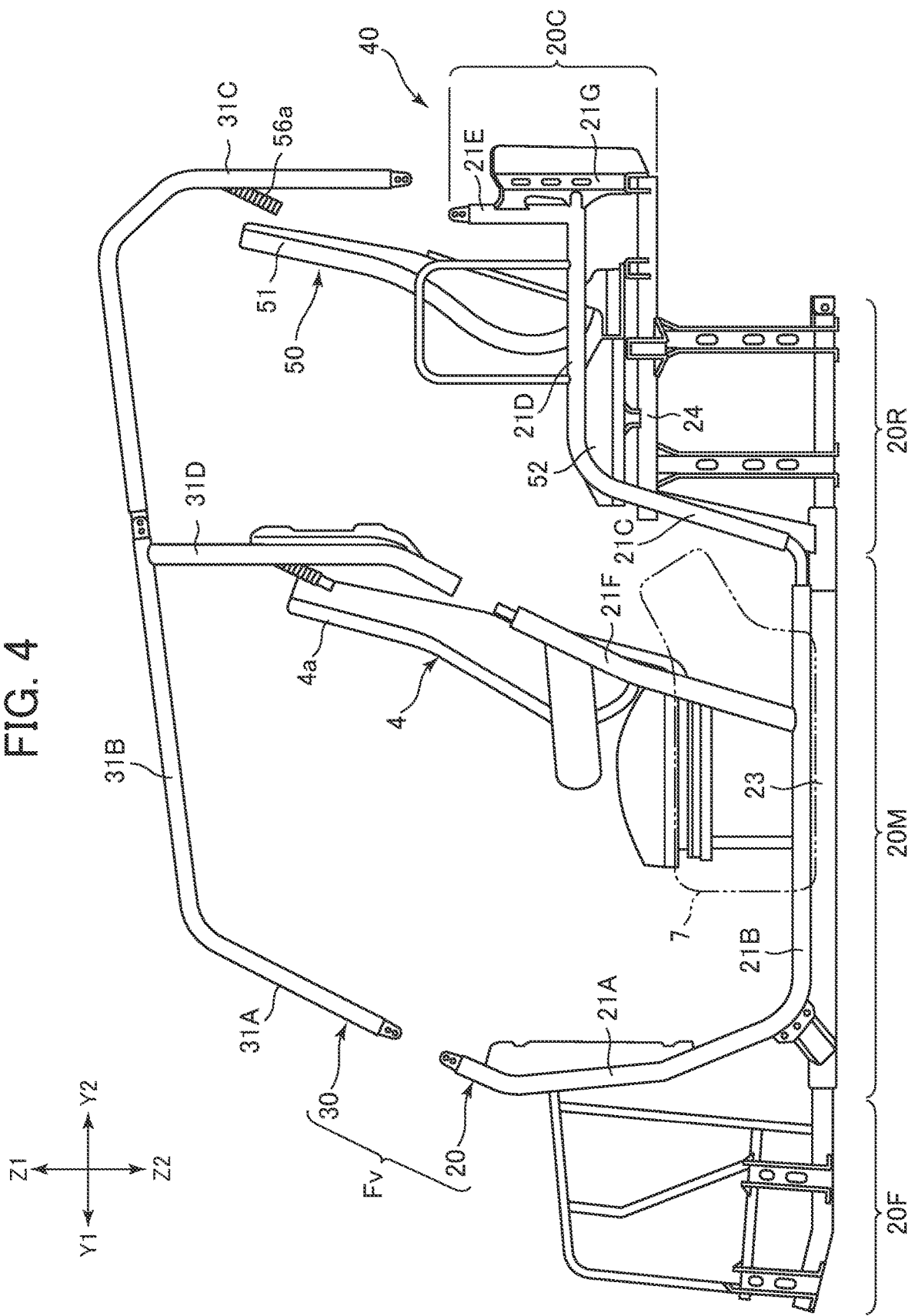
FIG. 4 is a side view of the vehicle frame of the vehicle.
Figure 5A:
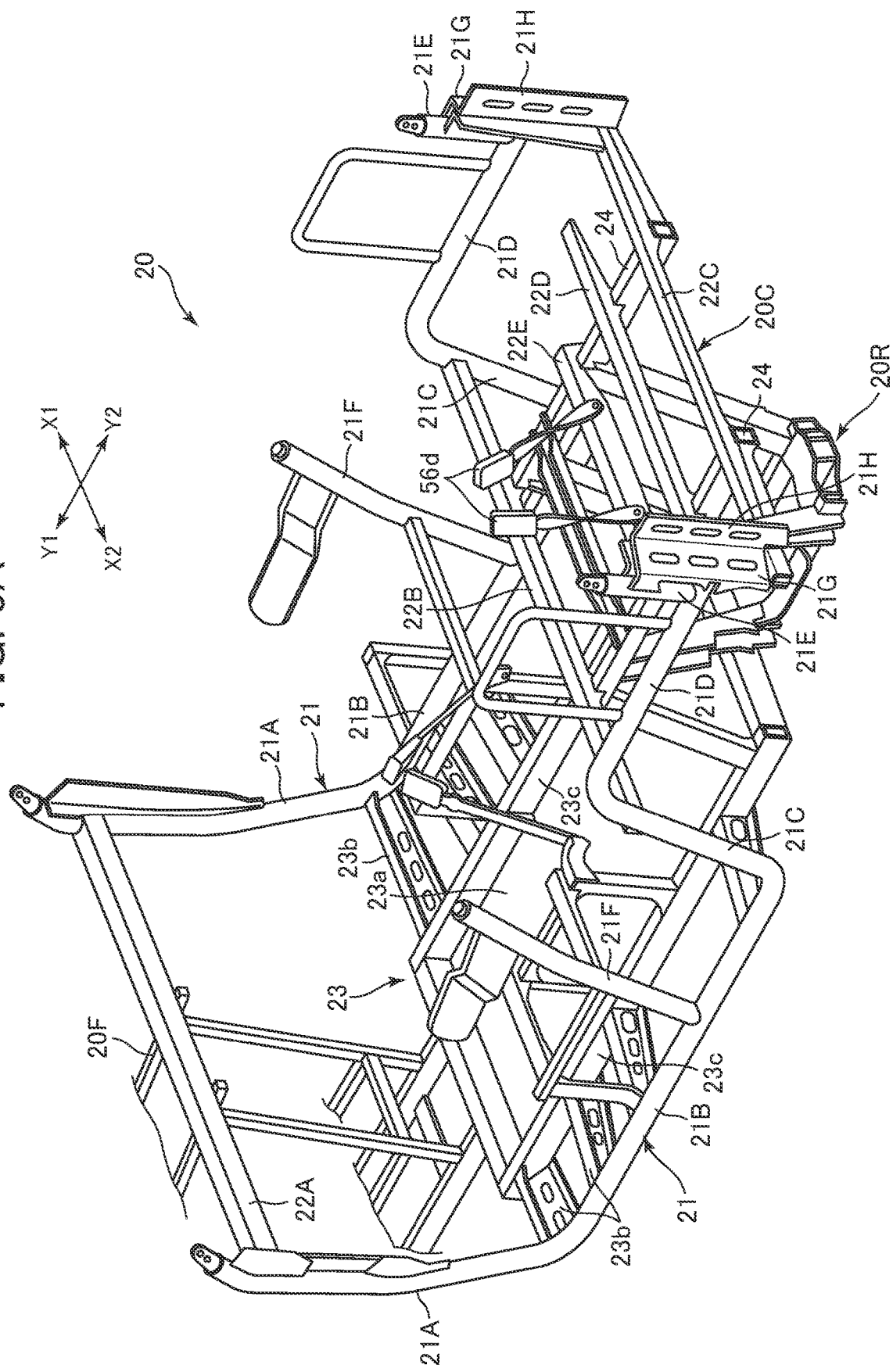
FIG. 5A is a perspective view of a lower frame (main body frame) constituting the vehicle frame.
Figure 6:
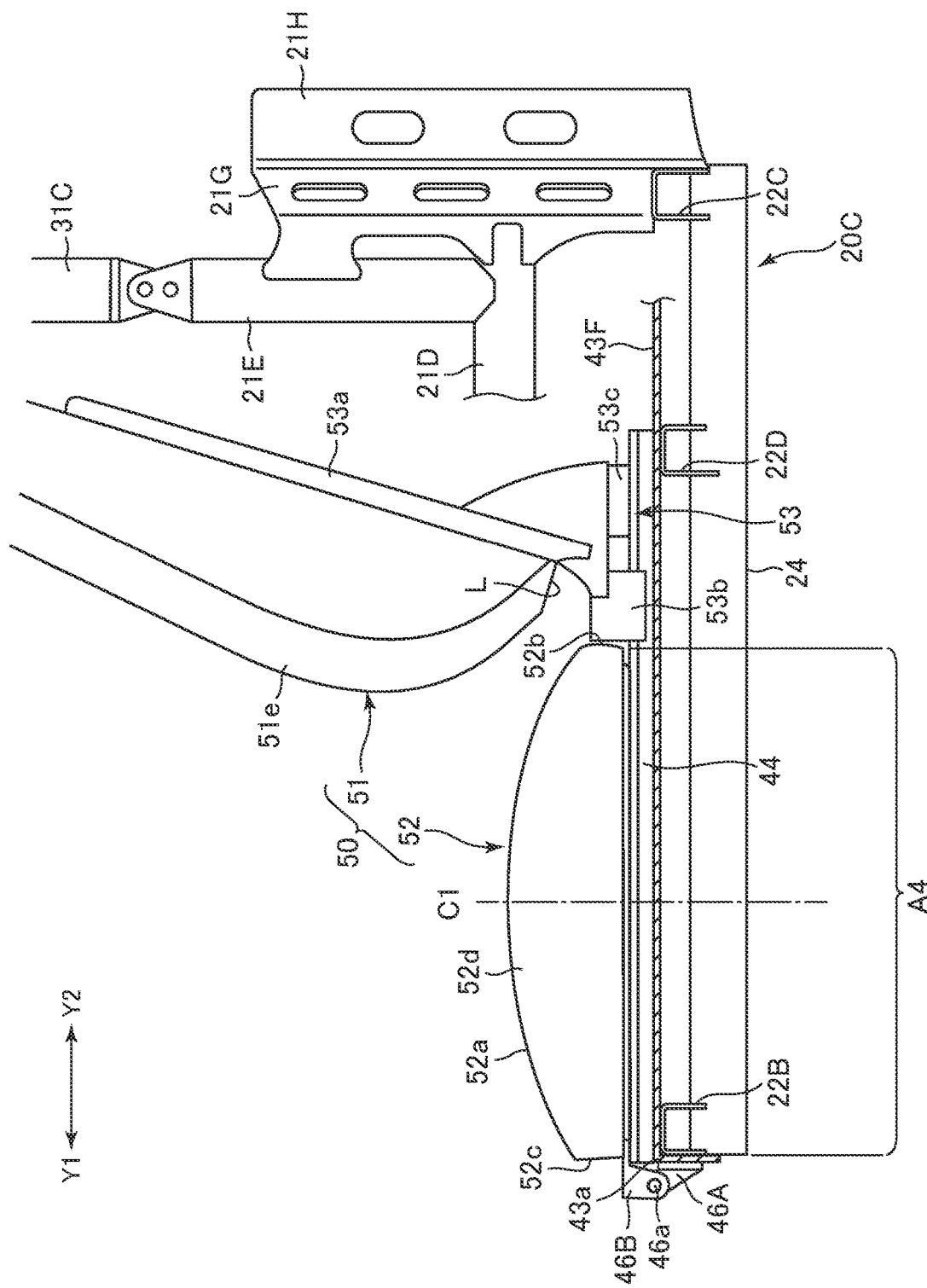
FIG. 6 is a side view of the rear seat. In this figure the rear seat is in a usable state.
Figure 7:
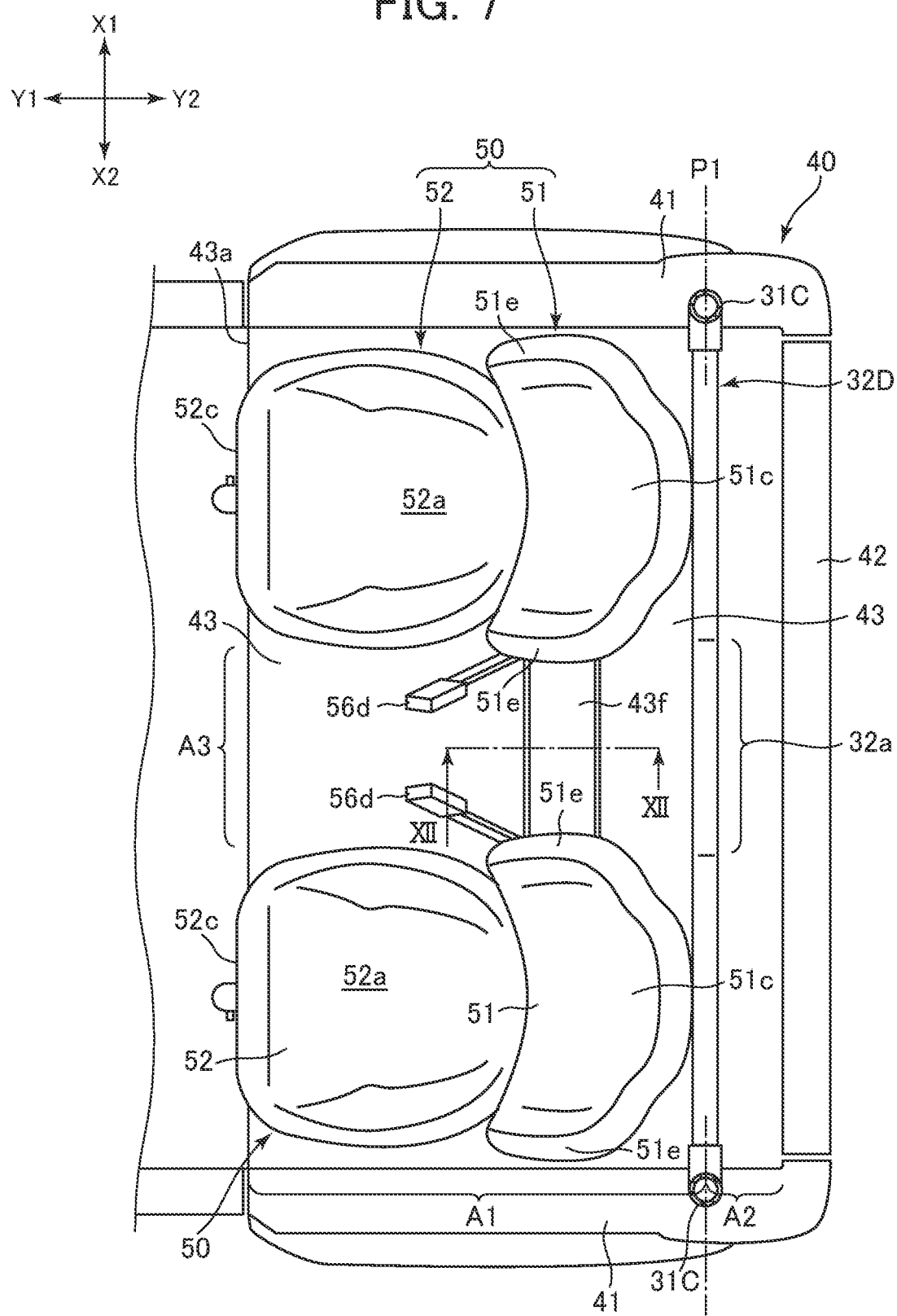
FIG. 7 is a plan view of the cargo bed provided in the rear portion of the vehicle body. In this figure, the rear seats are in the usable state.
Figure 8:
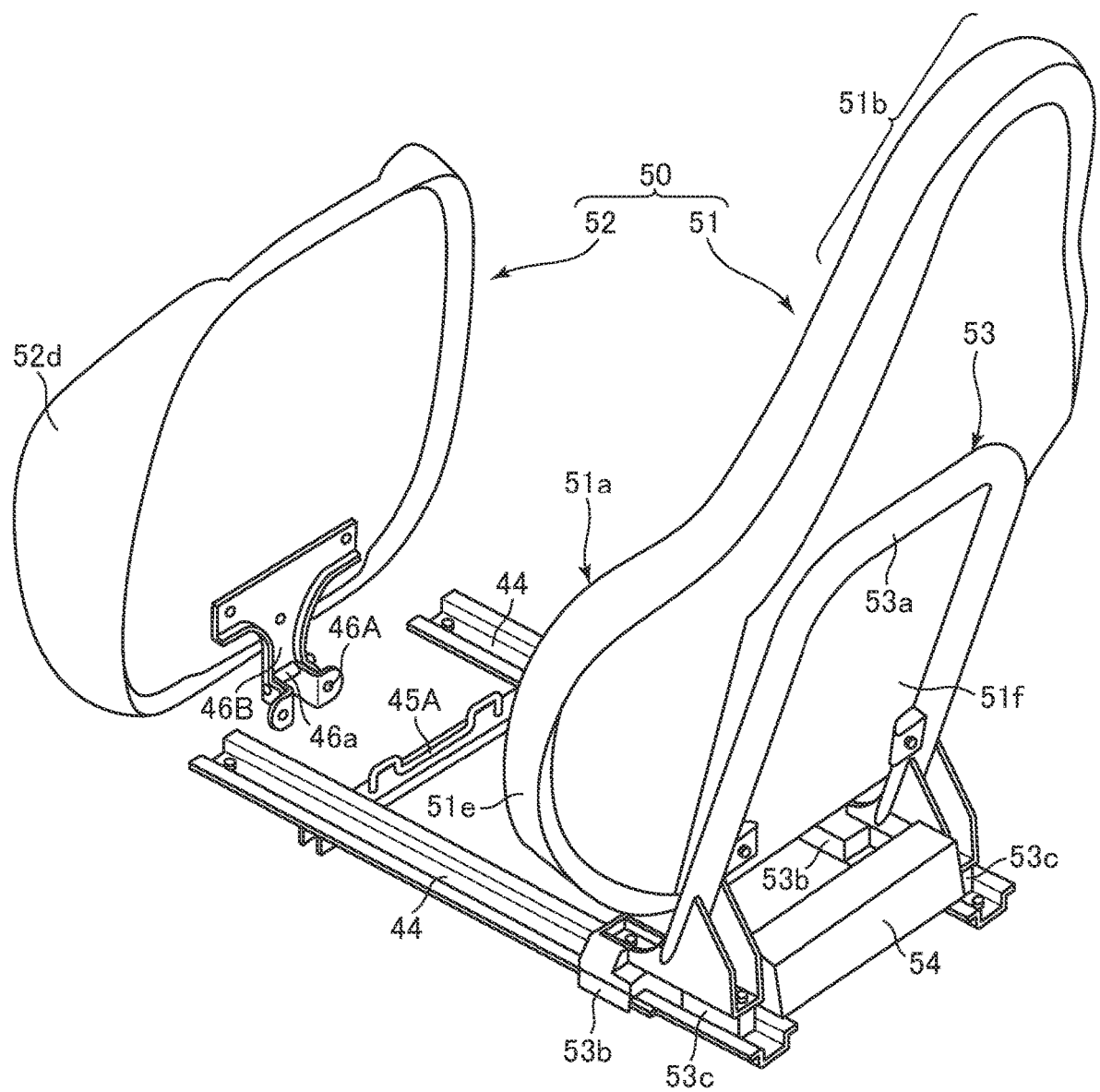
FIG. 8 is a perspective view showing a structure of the rear seat. In this figure, the seat bottom is arranged in a standing posture.
Figure 9:
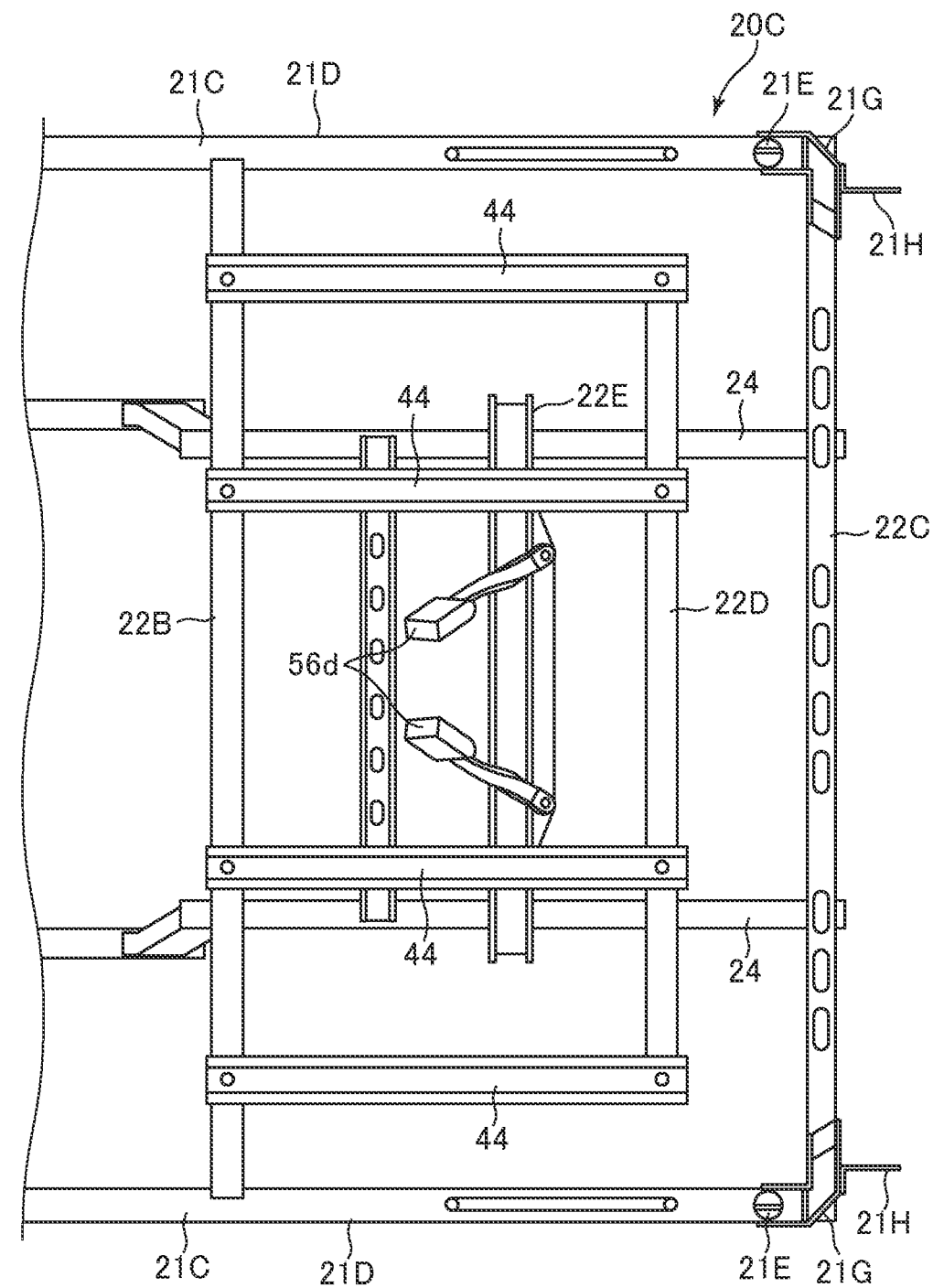
FIG. 9 is a plan view of a frame rear portion constituting the rear part of the lower frame.
Figure 10:
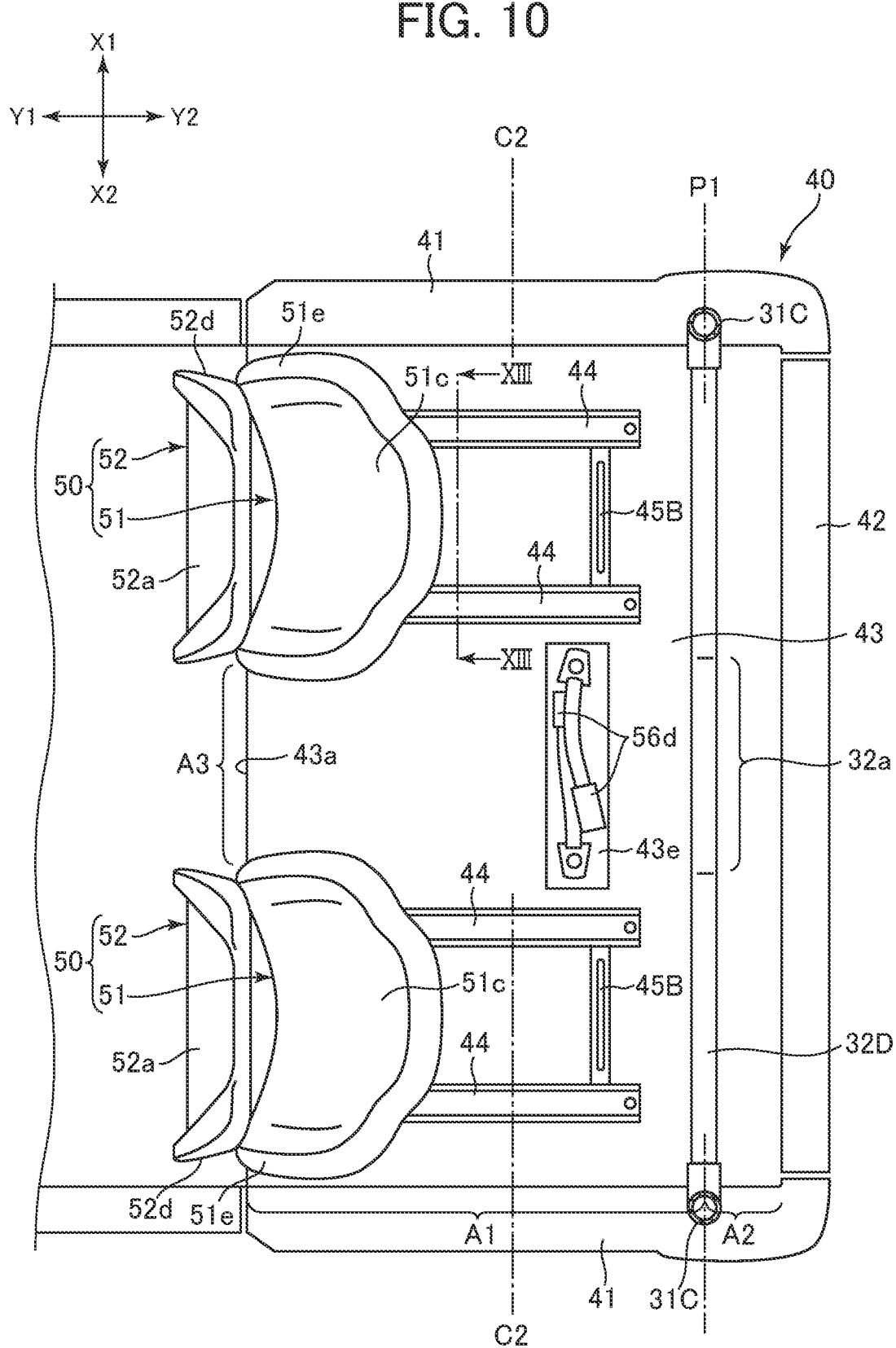
FIG. 10 is a plan view of the cargo bed. In this figure, the rear seats are arranged in an unusable state.
Figure 11:
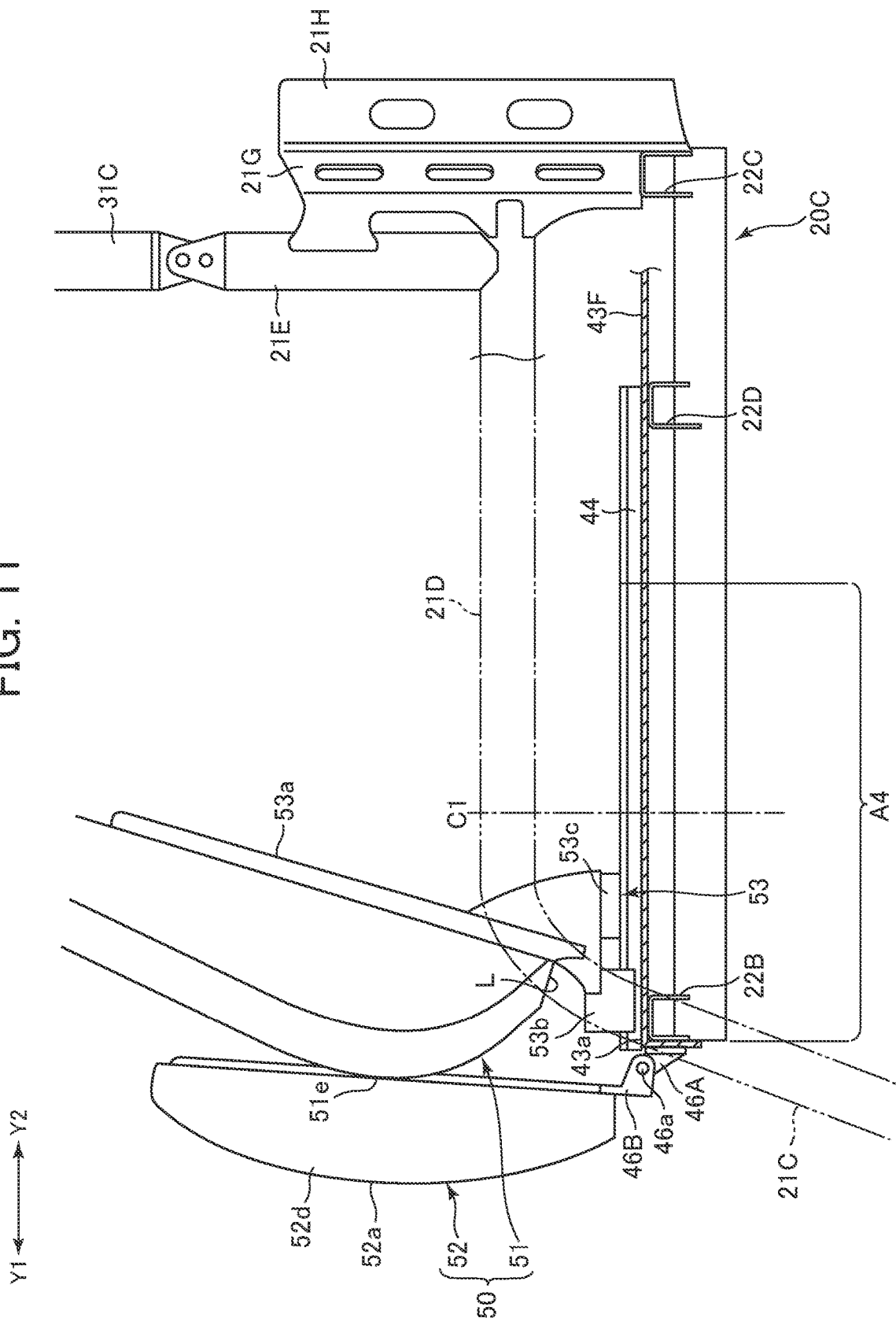
FIG. 11 is a side view of the rear seat. In this figure, the rear seat is in an unusable state.

FIG. 1 is a side view of a vehicle 1 which is an example of the embodiments of the present invention. FIG. 2 is a rear view of the vehicle 1. FIG. 3 is a perspective view showing the vehicle 1 obliquely viewed from the rear. FIG. 4 is a side view of the vehicle frame Fv of the vehicle 1. FIG. 5A is a perspective view of the lower frame 20 constituting a part of the vehicle frame Fv. FIG. 5B is a perspective view of an upper frame (roll cage) 30 constituting a part of the vehicle frame Fv. FIG. 6 is a side view of the rear seat 50, and FIG. 7 is a plan view of the cargo bed 40 provided in the rear portion of the vehicle body. In FIGS. 6 and 7, the rear seat 50 is in an "usable state", described later. FIG. 8 is a perspective view showing a structure of the rear seat 50. In FIG. 8, the seat bottom 52 is arranged at the standing position. FIG. 9 is a plan view of the frame rear portion 20R constituting the rear portion of the lower frame 20. FIG. 10 is a plan view of the cargo bed 40, and FIG. 11 is a side view of the rear seat 50. In FIGS. 10 and 11, the rear seat 50 is arranged in an "unusable state" described later.

In the following description, the directions indicated by Y1 and Y2 in those figures will be referred to as a "forward direction" and a "rearward direction", respectively. The directions indicated by Z1 and Z2 are referred to as an "upward direction" and a "downward direction", respectively. The directions indicated by X1 and X2 are referred to as a "rightward direction" and a "leftward direction", respectively.

[Outline of Vehicle]

The vehicle 1 is a vehicle that is suitable for use on rough terrain and is refereed to as an all terrain vehicle (ATV), a "Side-by-Side vehicle", an "Utility vehicle", and a "Recreational Off-Highway vehicle". As shown in FIG. 3, the vehicle 1 includes right and left front wheels 2 and right and left rear wheels 3. The vehicle 1 includes right and left front seats 4. A steering wheel 6 for steering the front wheels 2 is located ahead of the left front seat 4 on the left side. The vehicle 1 further includes right and left rear seats 50 located rearward of the front seats 4 and a cargo bed 40 also located rearward of the front seats 4. As will be explained in detail later, the rear seats 50 in the example of the vehicle 1, are mounted on the cargo bed 40.

An engine unit 7 (see FIG. 4) including an engine and a transmission is disposed in an almost middle portion of the vehicle body in the front-rear direction. The power of the engine unit 7 is transmitted to both the front wheels 2 and the rear wheels 3, or to one of the front wheels 2 and the rear wheels 3 through a drive shaft (not shown). In the example of the vehicle 1, the engine unit 7 is located between the right and left front seats 4. In the example of the vehicle 1, the engine unit 7 is located ahead of the cargo bed 40 (in other words, the rear portion 20R of the vehicle frame Fv to be described later). The arrangement of the engine unit 7 is not limited to the example of the vehicle 1.

[Vehicle Frame]

The vehicle 1 includes a vehicle frame Fv. As shown in FIG. 4, the vehicle frame Fv includes a lower frame 20 on which the seats 4, 50 and the engine unit 7 are mounted. The vehicle frame Fv also includes and an upper frame 30 covering the seats 4 and 50. The lower frame 20 will be hereinafter referred to as a "main body frame". The upper frame 30 will be referred to as a "roll cage". The main body frame 20 and the roll cage 30 are separately formed and connected to each other in the vertical direction by fixing means such as welding or bolts. That is, the main body frame 20 includes a plurality of constituent elements (for example, pipes) each of which is integrally made of a metal. The roll cage 30 includes a plurality of constituent elements (for example, pipes) made of a metal separately from the constituent elements of the main body frame 20. The constituent elements of the main body frame 20 and the constituent elements of the roll cage 30 are connected to each other by fixing means such as welding or bolts. Note that the phrase "the upper frame 30 covers the seats 4 and 50" means that at least a part of the upper frame 30 is positioned above the seats 4 and 50 in a side view, and thus, the upper frame 30 may not overlap with the seats 4 and 50 in a planar view.

[Main Body Frame]

As shown in FIG. 4, the main body frame 20 includes a frame front portion 20F located between the right and left front wheels 2. The frame front portion 20F supports the front wheels 2 through a suspension 8 (see FIG. 1) and through arms (not shown) extending in the right-left direction. The main body frame 20 also includes a frame rear portion 20R located between the right and left rear wheels 3. The frame rear portion 20R also supports the rear wheels 3 through a suspension (not shown) and through arms (not shown) extending in the right-left direction. A cargo bed frame 20C that is a frame of the cargo bed 40 to be described later is formed on the upper side of the frame rear portion 20R. The cargo bed frame 20C protrudes rearward from the frame rear portion 20R. The main body frame 20 includes a frame middle portion 20M located between the frame front portion 20F and the frame rear portion 20R. The frame middle portion 20M has the engine unit 7 and the front seats 4 mounted thereon.

As shown in FIG. 5A, in the example of the vehicle 1, the frame middle portion 20M includes extending portions 21 on its right and left portions. The extending portion 21 includes, in the middle frame portion 20M, a middle portion 21B extending in the front-rear direction, a front vertical portion 21A extending obliquely upward from the front portion of the middle portion 21B, and a rear vertical portion 21C extending obliquely upward from the rear portion of the middle portion 21. The extending portion 21 includes, in the frame middle portion 20M, a middle vertical portion 21F extending upward from the mid portion of the middle portion 21B. Additionally, the extending portion 21 includes a side wall extending portion 21D extending rearward from an upper portion of the rear vertical portion 21C. The side wall extending portion 21D constitutes the side wall 41 (see FIG. 3) of the cargo bed 40. Further, the extending portion 21 has a cargo bed vertically extending portion 21E extending upward from the side wall extending portion 21D. Each portion of the extending portion 21 is formed of a pipe, for example, but it is not necessarily limited thereto. The extending portion 21 may be an integrally formed member, or the extending portion 21 may be constituted by plural members (for example, pipes) connected to each other. For example, the middle portion 21B and the front vertical portion 21A may be one pipe integrally formed, the rear vertical portion 21C and the side wall extending portion 21D may be one pipe integrally formed, and the two pipes are connected to each other by fixing means such as such as welding or bolts.

In the example of the vehicle 1, as shown in FIG. 5A, the frame middle portion 20M includes a bottom 23 between the right and left middle portions 21B. The bottom 23 includes, for example, a bottom panel 23a, members 23b extending in the right-left direction and joined to the bottom panel 23a, members 23c extending in the front-rear direction and joined to the bottom panel 23a. The right and left middle portions 21B are joined (for example, welded) to the left and right edges of the bottom 23, respectively. The engine unit 7 and the front seat 4 are supported by the bottom 23. Also, plural cross portions 22A, 22B, 22C extend between the right and left extending portions 21. The structure of the main body frame 20 and the shape of each portion are not limited to the example in the vehicle 1. For example, the bottom 23 of the main body frame 20 does not necessarily include the bottom panel 23a.

[Roll Cage]

As shown in FIG. 5B, the roll cage 30 includes right and left front vertically extending portions 31A, right and left upper extending portions 31B, right and left rear vertically extending portions 31C, and right and left middle vertically extending portions 31D (See FIG. 5). As shown in FIG. 4, the front vertically extending portion 31A is located forward of the front seat 4 in a side view of the vehicle body and extends in the vertical direction. Specifically, in the example of the vehicle 1, the front vertically extending portion 31A extends obliquely rearward and upward. The front vertically extending portion 31A is connected to the front vertical portion 21A of the main body frame 20 by fixing members such as bolts. The upper extending portion 31B is located above the seats 4 and 50 in a side view of the vehicle body and extends in the front-rear direction. The rear vertically extending portion 31C extends downward from the rear portion of the upper extending portion 31B and is located rearward of at least the front seat 4. In the example of the vehicle 1, the rear vertically extending portion 31C is located slightly rearward of the rear seat 50. The rear vertically extending portion 31C may overlap the rear seat 50 (more specifically, the seat back 51 described later) in a side view of the vehicle body. The rear vertically extending portion 31C in the example of the vehicle 1 is arranged in the vertical direction in general, but it may be inclined in a forward or backward direction. The rear vertically extending portion 31C is connected to the cargo bed vertically extending portion 21E of the cargo bed frame 20C, for example, by fixing members such as bolts. The right and left rear vertically extending portions 31C are apart from each other in the right-left direction and thus users can load and unload cargo into the cargo bed 40 through the opening caused between the right and left rear vertically extending portions 31C.

The middle vertically extending portion 31D extends downward from a mid portion of the upper extending portion 31B and is located between the front vertically extending portion 31A and the rear vertically extending portion 31C in a side view of the vehicle body. In the example of the vehicle 1, the middle vertically extending portion 31D overlaps the front seat 4 (more specifically, the seat back 4a of the front seat 4) in a side view of the vehicle body (see FIG. 1). The middle vertically extending portion 31D may be located slightly rearward of the front seat 4. The middle vertically extending portion 31D is connected to the middle vertical portion 21F of the main body frame 20 by fixing members such as bolts, for example.

As shown in FIG. 5B, the roll cage 30 also includes a plurality of cross portions 32A to 32E extending in the right-left direction to connect the right and left extending portions 31A to 31D. In the example of the vehicle 1, three cross portions 32A, 32B, 32C extend between right and left upper extending portions 31B. A cross portion 32D extends between the right and left rear vertically extending portions 31C. Further, a cross portion 32E extends between the right and left middle vertically extending portions 31D. The cross portions 32D and 32E will be described later in detail. As shown in FIG. 1, a roof 11 is attached to the roll cage 30 to cover the seats 4 and 50. In detail, the roof 11 is attached to, for example, the right and left upper extending portions 31B and the cross portions 32A, 32B, and 32C, connected to the upper extending portions 31B. The roof 11 is made of resin, for example.

In the example of the vehicle 1, the cross portions 32A to 32E are formed separately from one another, and both ends of each cross portion 32A to 32E are connected to the extending portions 31A to 31D by fixing means such as welding or bolt. The connection structure of portions of the roll cage 30 may be changed. For example, the right and left front vertically extending portions 31A and the front cross portion 32A may be integrally formed of single pipe-like member. The right and left middle vertically extending portions 31D and the central cross portion 32B may be integrally formed of single pipe-like member. Further, the right and left rear vertically extending portions 31C and the rear cross portion 32C may be integrally formed of single pipe-like member.

[Cargo Bed]

As shown in FIG. 3, the vehicle 1 includes a cargo bed 40 at the rear portion thereof. The cargo bed 40 includes a cargo bed floor 43 (see FIG. 7) on which cargo is placed. The cargo bed 40 also includes side walls 41 located on the right and left sides of the cargo bed floor 43 and a rear wall 42 located at the rear edge of the cargo bed floor 43.

The lower portion of the rear vertically extending portion 31C of the roll cage 30 is connected to the cargo bed frame 20C constituting the cargo bed 40. The cargo bed frame 20C includes the side wall extending portions 21D and the cargo bed vertically extending portions 21E described above. As shown in FIGS. 1 and 7, the cargo bed floor 43 of the cargo bed 40 includes an area A1 extending forward beyond the plane P1 defined by the right and left rear vertically extending portions 31C (in other words, the plane P1 is defined as a plane parallel to the right-left direction of the vehicle body and passing through the right and left rear vertically extending portions 31C.). In the example of the vehicle 1, the cargo bed frame 20C includes the cargo bed vertically extending portion 21E extending upward from the side wall extending portion 21D to connect to the rear vertically extending portion 31C of the roll cage 30. The area A1 of the cargo bed floor 43 is located further forward than the connection portion between the side wall extending portion 21D and the cargo bed vertically extending portion 21E of the cargo bed frame 20C in a side view of the vehicle body. The connection structure between the cargo bed frame 20C and the roll cage 30 is not limited to the example of the vehicle 1. For example, the lower portion of the rear vertically extending portion 31C of the roll cage 30 may be directly connected to the side wall extending portion 21D of the cargo bed frame 20C.

In the example of the vehicle 1, the right and left rear seats 50 are disposed on the cargo bed floor 43. The rear seat 50 includes a seat bottom 52 (see FIG. 7) located in the lower part of the rear seat 50 and including an upper surface for the rider to sit on, and a seat back 51 standing on the rear side of the seat bottom 52 and including a front surface for supporting the back of the rider. The seat bottom 52 is disposed in the area A1 of the cargo bed floor 43 in a plan view of the vehicle body. The front edge of the seat bottom 52 is located along the front edge 43a of the cargo bed floor 43 in a plan view of the vehicle body. The front edge of the seat bottom 52 may be located slightly forward of the front edge 43a of the cargo bed floor 43, and alternatively may be located slightly rearward of the front edge 43a of the cargo bed floor 43. In other words, the entire seat bottom 52 may be located on the cargo bed floor 43, and alternatively only a part of the seat bottom 52 may be located within the area A1 of the cargo bed floor 43.

The rear seat 50 is configured to be movable so as to expand the capacity of the cargo bed 40. That is, the cargo bed floor 43 includes an area in which the seat bottom 52 is located (an area covered by the seat bottom 52) when the rear seat 50 is in its usable state. The rear seat 50 is configured to recede from at least a part of the area. As will be described later, in the example of the vehicle 1, guide rails 44 extending in the front-rear direction are attached to the area A1 of the cargo bed floor 43 (see FIG. 10). The rear seat 50 (in more detail, the seat back 51) is slidable in the front-rear direction along the guide rails 44. The forward slide of the rear seat 50 increases the capacity of the cargo bed 40. The movement mode of the rear seat 50 is not limited to the example in the vehicle 1. For example, the seat back 51 of the rear seat 50 may be configured to be movable toward the side wall 41 of the cargo bed 40. In other words, the seat back 51 may be turnable toward the side wall 41 of the cargo bed 40. In yet another example, the seat back 51 may be foldable in a forward direction.

As shown in FIG. 7, the cargo bed floor 43 includes an area A2 formed behind the area A1. That is, the cargo bed floor 43 includes an area A2 located rearward of the plane P1 defined by the rear vertically extending portions 31C of the roll cage 30 (hereinafter, the area A1 is referred to as a "front area" and the area A2 is referred to as a "rear area"). In the example of the vehicle 1, the rear area A2 is located further rearward than the cross portion 32D extending between the right and left rear vertically extending portions 31C in a plan view of the vehicle body. Also, the rear area A2 is located further rearward than the rear seats 50 in a plan view of the vehicle body. More specifically, the rear area A2 is located further rearward than the rear end (upper end) of the seat backs 51 in the plan view of the vehicle body. Unlike the example of the vehicle 1, a part of the rear area A2 may overlap the seat backs 51.

As shown in FIG. 7, the right and left rear seats 50 are located apart from each other in the right-left direction. Therefore, the front area A1 includes an area A3 defined between the right and left rear seats 50 (hereinafter this area A3 will be referred to as the "middle area").

The front area A1 (including the middle area A3) and the rear area A2 are located at the same height. Therefore, when a rear seat 50 is moved, the front area A1 and the rear area A2 can be used effectively. In other words, the structure facilitates easily placing cargo on the cargo bed 40. The height of front area A1 and the height of rear area A2 are different.

[Cargo Bed Frame]

As described above, the main body frame 20 includes the frame rear portion 20R connected with arms and a suspension for supporting the rear wheels 3. In the example of the vehicle 1, the cargo bed frame 20C (see FIG. 4) is formed on the upper side of the frame rear portion 20R. A floor panel 43F (see FIG. 6) constituting the cargo bed floor 43 is fixed to the upper side of the cargo bed frame 20C. The floor panel 43F covers the entire cargo bed frame 20C. The cargo bed frame 20C is located above the rear wheel 3 in a side view of the vehicle body (see FIG. 1).

As shown in FIG. 5A, in the example of the vehicle 1, the cargo bed frame 20C includes a plurality of floor support portions 24 extending linearly in the front-rear direction. The cargo bed frame 20C includes a plurality of cross portions 22B, 22C, 22E and 22D extending in the right-left direction and fixed to the floor support portions 24. Hereinafter, these cross portions 22B, 22C, 22E and 22D will be referred to as "floor cross portions". In an example, the plurality of floor cross portions 22B, 22C, 22E, 22D are fixed on the upper side the floor support portion 24, and the floor panel 43F is fixed on the floor cross portions 22B, 22C, 22E, 22D. The floor cross portions 22B, 22C, 22E, 22D are located at the same height. Thus, the height in an area of the cargo bed floor 43 where the rear seat 50 is disposed and the height in an area of the cargo bed floor 43 behind the area where the rear seat 50 is disposed are the same. That is, the entire cargo bed floor 43 has the same height.

The floor cross portion 22B is located at the front end of the cargo bed floor 43 and the floor cross portion 22C is located at the rear end of the cargo bed floor 43. The floor cross portions 22E, 22D are arranged between the floor cross portion 22B and the floor cross portion 22C. The guide rails 44 of the rear seat 50 are supported, for example, by the floor cross portion 22B located at the front end and the floor cross portion 22D located between the floor cross portions 22B and 22C (see FIG. 9).

As shown in FIG. 5A, in the example of the vehicle 1, the floor cross portion 22B at the front end extends between the right and left rear vertical portions 21C of the main body frame 20 and fixed to the front ends of the floor support portions 24. The cargo bed frame 20C includes rear end members 21G fixed to the rear ends of the side wall extending portions 21D constituting the side wall 41 of the cargo bed 40 and extending in the vertical direction. The floor cross portion 22C at the rear end extends between the right and left rear end members 21G and is fixed to the rear ends of the floor support portions 24. The structure of the cargo bed frame 20C is not limited to the example of the vehicle 1 and may be changed. For example, the floor support portions extending in the front-rear direction may be fixed on the upper side of the plurality of floor cross portions. In addition, the floor panel 43F may be fixed to the floor support portions.

[Rear Cross Portion of Roll Cage]

As described above, both end portions 32c of the cross portion 32D located at the rear end of the roll cage 30 are connected to the right and left rear vertically extending portions 31C. As shown in FIG. 2, the cross portion 32D is formed such that its middle portion 32a is positioned higher than the end portions 32c. When an operator puts cargo onto the front area A1 located forward of the plane P1, the structure described above prevents the cross portion 32D from being an obstruction.

As described above, in the example of the vehicle 1, the right and left rear seats 50 are apart from each other in the right-left direction, and the middle area A3 (see FIG. 7) for cargo is secured between the right and left rear seats 50. In detail, the middle area A3 is secured between the right and left seat bottoms 52. The middle area A3 located forward of the middle portion 32a of the cross portion 32D in a plan view of the vehicle body. Since the middle portion 32a of the cross portion 32D is higher than the end portions 32c, the cross portion 32D is prevented from being an obstruction when an operator puts cargo onto the middle area A3.

As shown in FIG. 2, in the example of the vehicle 1, the cross portion 32D includes lateral portions 32b located behind the seat backs 51 of the right and left rear seats 50. This allows the seat back 51 to be supported by the lateral portion 32b. For example, when a force acts on the seat back 51 in the front-rear direction during running of the vehicle, the lateral portion 32b prevents the seat back 51 from being greatly inclined rearward. In a normal state in which no backward force is applied to the seat back 51, a clearance may be secured between the lateral portion 32b and the seat back 51, or alternatively the lateral portion 32b may be in contact with the seat back 51.

In the example of the vehicle 1, the seat back 51 is configured to support the rear side of the head of the rider. That is, as shown in FIG. 2, the seat back 51 includes a lower portion 51a that supports the back of a rider and an upper portion 51b having a smaller width in the right-left direction than the lower portion 51a (hereinafter, the lower portion 51a is referred to as a "back rest portion", and the upper portion 51b is referred to as a "head rest".). The head of the rider can be supported by the head rest 51b. The lateral portion 32b of the cross portion 32D is located behind the head rest 51b of the seat back 51. Therefore, the lateral portion 32b of the cross portion 32D is positioned high, and thus when an operator puts cargo onto the rear side of the rear seat 50, the cross portion 32D is prevented from being an obstruction.

As shown in FIG. 2, the middle portion 32a of the cross portion 32D is located higher than the lateral portions 32b. The middle portion 32a of the cross portion 32D is located between the right and left seat backs 51 in the rear view of the vehicle body. In the example of the vehicle 1, the middle portion 32a linearly extends in the right-left direction in a rear view of the vehicle body. This shape of the cross portion 32D effectively prevents the cross portion 32D from being an obstacle when putting cargo onto the area between the right and left rear seats 50.

As shown in FIG. 2, the end portions 32c of the cross portion 32D are positioned higher than the back rest portion 51a. Therefore, the cross portion 32D is prevented from being an obstacle when an operator puts cargo onto the rear side of the seat 50. As described above, in the example of the vehicle 1, the rear seats 50 are configured to be slidable in a forward direction. Therefore, the cross portion 32D is prevented from being an obstacle when an operator puts cargo onto an area formed by sliding the rear seats 50.

The lateral portion 32*b* of the cross portion 32D linearly extends in the right-left direction in the rear view of the vehicle body. According to this shape of the cross portion 32D, a force equally acts from the seat back 51 to the lateral portion 32*b* and thus the seat back 51 can be stably supported by the lateral portion 32*b*. As described here, the cross portion 32D in the example of the vehicle 1 includes the lateral portions 32*b* linearly extending in the right-left direction and the middle portion 32*a* linearly extending in the right-left direction. The end of the lateral portion 32*b* is bent up toward the middle portion 32*a*.

The shape and the position of the cross portion 32D is not limited to the example in the vehicle 1. For example, the lateral portions 32*b* and the middle portion 32*a* may not extend linearly. That is, the whole of the cross portion 32D may be curved such that the middle portion 32*a* is positioned higher than the end portion 32*c*. Also, the lateral portion 32*b* and the end portion 32*c* of the cross portion 32D may be located behind the back rest portion 51*a*.

[Front Cross Portion of Roll Cage]

As shown in FIG. 5B, the roll cage 30 includes a cross portion 32E located forward of the cross portion 32D and lower than the cross portion 32D. In the example of the vehicle 1, both ends 32*e* of the cross portion 32E are connected to the right and left middle vertically extending portion 31D. The cross portion 32E improves the rigidity of the roll cage 30.

As shown in FIG. 3, the cross portion 32E is located behind the right and left front seats 4. More specifically, the cross portion 32E includes lateral portions 32*f* located behind the seat backs 4*a* of the right and left front seats 4. The seat back 4*a* is supported by the lateral portion 32*f*. For example, when a force acts on the seat back 4*a* in the front-rear direction during running of the vehicle, the lateral portion 32*f* prevents the seat back 4*a* from being reclined greatly. In the normal state in which the rearward force is not applied to the seat back 4*a*, a clearance may be made between the lateral portion 32*f* and the seat back 4*a*, or alternatively the lateral portion 32*f* may be in contact with the seat back 4*a*.

As shown in FIG. 2, the middle portion 32*g* of the cross portion 32E located behind the front seat 4, is positioned between the right and left front seats 4 in the rear view of the vehicle. The middle portion 32*g* is located at a different height than the end portions 32*e* of the cross portion 32E. In more detail, the middle portion 32*g* is located at a different height than the lateral portions 32*f*. This prevents the middle portion 32*g* of the cross portion 32E from being an obstacle to a field of view of a rider sitting on the rear seat 50. In the example of the vehicle 1, the middle portion 32*g* is located lower than the lateral portion 32*f*. Unlike the example of the vehicle 1, the middle portion 32*g* of the cross portion 32E may be located higher than the lateral portion 32*f*, similar to the middle portion 32*a* of the cross portion 32D located behind the rear seats 50.

As shown in FIG. 5B, in the example of the vehicle 1, the roll cage 30 includes a grab bar 34 located under the cross portion 32E and connected to the right and left middle vertically extending portions 31D. A rider sitting on the rear seat 50 may grab the grab bar 34. In the example of the vehicle 1, the middle portion of the grab bar 34 is located under the middle portion 32*g* of the cross portion 32 E and is fixed to the middle portion 32*g* of the cross portion 32E. According to this structure, the grab bar 34 can be reinforced by the cross portion 32E even when a member having a lower rigidity than the cross portion 32E (for example, a member thinner than the cross portion 32E) is used as the grab bar 34. The grab bar 34 is located below the lateral portions 32*f* of the cross portion 32E. The structure of the grab bar 34 and the cross portion 32E is not limited to the example above, of the vehicle 1. In another example, the grab bar 34 is not necessarily fixed to the cross portion 32E. In yet another example, the roll cage 30 does not necessarily include the grab bar 34.

[Connection Between Cargo Bed Frame and Roll Cage]

The main body frame 20 includes the rear vertical portions 21C (see FIG. 5A) extending obliquely rearward and upward from the rear portion of the middle portion 21B of the frame middle portion 20M. As shown in FIG. 1, in the example of the vehicle 1, the rear vertically extending portion 31C of the roll cage 30 is located further rearward than the upper portion of the rear vertical portion 21C of the main body frame 20. In other words, the rear vertically extending portion 31C of the roll cage 30 is located rearward of the front end of the side wall extending portion 21D constituting the side wall 41 of the cargo bed 40. The arrangement of the rear vertically extending portion 31C makes the rear vertically extending portion 31C closer to a vertical orientation as compared with an arrangement in which the rear vertically extending portion 31C is connected to the rear vertical portion 21C. As a result, the vertical force tends to act axially on the rear vertically extending portion 31C. When the rear seat 50 is slid forward, the seat back 51 is located forward, away from the rear vertically extending portion 31C in a side view of the vehicle body. As shown in FIG. 1, the vehicle 1 may be provided with a side guard 12 located on the lateral side of the rear seats 50.

As shown in FIG. 4, the cargo bed frame 20C protrudes rearward from the frame rear portion 20R supporting the rear wheels 3. As shown in FIG. 6, the rear vertically extending portion 31C of the roll cage 30 is connected to the cargo bed frame 20C at a position forward of the rear end of the cargo bed frame 20C. In the example of the vehicle 1, the rear vertically extending portion 31C of the roll cage 30 is connected to the cargo bed frame 20C at a position forward of the rear end of the floor support portion 24 supporting the cargo bed floor 43. Thus, the rear vertically extending portion 31C and the frame rear portion 20R are close to each other in the front-rear direction. That increases the strength of the cargo bed frame 20C with respect to the vertical force acting on the roll cage 30. Also, since the rear vertically extending portion 31C of the roll cage 30 is connected to the cargo bed frame 20C at a position forward of the rear end of the floor support portion 24, the rear area A2 located behind the plane P1 described above is surly secured in the cargo bed floor 43.

In the example of the vehicle 1, the cargo bed frame 20C includes a cargo bed vertically extending portion 21E located further forward than the rear end of the floor support portion 24 and extends upward from the side wall extending portion 21D. The rear vertically extending portion 31C of the roll cage 30 is connected to the cargo bed vertically extending portion 21E. The connecting structure between the cargo bed frame 20C and the rear vertically extending portion 31C of the roll cage 30 is not limited to the example of the vehicle 1. For example, the rear vertically extending portion 31C may be directly connected to the side wall extending portion 21D.

As shown in FIG. 6, in the example of the vehicle 1, the cargo bed frame 20C includes rear end members 21G at the rear ends thereof. The rear end member 21G extends in the vertical direction and connects the rear end of the side wall extending portion 21D, the cargo bed vertically extending portion 21E, and the floor support portion 24. This structure improves, for example, the strength of the rear portion of the cargo bed frame 20C. As shown in FIG. 6, the rear end member 21G is provided with a rear wall support portion 21H further protruding rearward from the rear end member 21G. The right end and the left ends of the rear wall 42 of the cargo bed 40 are fixed to the rear wall support portions 21H, respectively. Therefore, the rear wall 42 is located further rearward than the cargo bed vertically extending portion 21E of the cargo bed frame 20C or the rear vertically extending portion 31C of the roll cage 30. As a result, the capacity of cargo bed 40 can be increased.

[Rear Seat]

The rear seat 50 is movable to a state in which the rider is allowed to sit on the rear seat 50 and a state in which the rider is not allowed to sit thereon. In the following description, the state in which the rider is allowed to sit on the rear seat 50 is referred to as the "usable state", and the state in which the rider is not allowed to sit thereon is referred to as the "unusable state". When the rear seat 50 is in the "usable state", as shown in FIG. 6, the seat bottom 52 is located on the cargo bed floor 43, the seat surface 52a of the seat bottom 52 faces upward, and the seat back 51 is located in a standing position on the rear side of the seat bottom 52. The "unusable state" means a state in which at least one of the position and the orientation of the seat bottom 52 changes from the position and the orientation thereof in the usable state and the seat back 51 moves forward so that the rider is not allowed to sit on the rear seat 50. In the example of the vehicle 1, when the area in which the seat bottom 52 of the rear seat 50 in the usable state is disposed is defined as a seat bottom area A4 (see FIG. 6), the lower end L of the seat back 51 (in other words, the lower end of the seat frame 53 to be described later) moves to a front portion of the seat bottom area A4 when the rear seat 50 is in the unusable state (see FIG. 11).

As shown in FIG. 10, the cargo bed floor 43 is provided with guide rails 44. In the example of the vehicle 1, the guide rails 44 are disposed on the floor panel 43F constituting the cargo bed floor 43. The guide rails 44 are then fixed to the cargo bed frame 20C located below the floor panel 43F by fixing members such as screws or bolts. In the example of the vehicle 1, two guide rails 44 are arranged in parallel for each rear seat 50. As shown in FIG. 8, the rear seat 50 includes the seat frame 53 attached to the guide rails 44. The seat frame 53 is slidable in the front-rear direction along the guide rails 44 (see FIG. 10). In the example of the vehicle 1, the seat frame 53 includes the guided portions 53b, 53c mounted on the guide rail 44 and slidable along the guide rails 44. The guided portion 53b is located outside the guide rails 44.

As shown in FIG. 8, in the example of the vehicle 1, the seat frame 53 is fixed to the seat back 51. Therefore, the seat back 51 is allowed to move in the front-rear direction. Specifically, the seat back 51 is allowed to translate in the front-rear direction. This can increase the capacity of the cargo bed 40 while preventing the vehicle from becoming larger in the front-rear direction. That is, the forward movement of the seat back 51 places the rear seat 50 in the unusable state and enlarges the rear cargo area of the rear seat 50. In the example of the vehicle 1, the seat frame 53 includes a support rod 53a extending upwardly from the guided portions 53b, 53c and fixed to the seat back 51. The support rod 53a is fixed to the back of the seat back 51, for example. Further, as shown in FIG. 8, the support rod 53a may be connected to the right and left guided portions 53b and 53c. The structure of the seat frame 53 and the fixing structure between the seat frame 53 and the seat back 51 are not limited to the example shown for the vehicle 1 and may be changed.

As shown in FIG. 8, in the example of the vehicle 1, the seat bottom 52 is not fixed to the seat frame 53 and thus is configured to move independently of the seat back 51. In the example of the vehicle 1, the seat bottom 52 is laid on the guide rail 44 when the rear seat 50 is in the usable state (see FIG. 6) and is in a standing position when the rear seat 50 is in the unusable state (see FIGS. 8 and 11). Unlike the example of the vehicle 1, the seat bottom 52 may also be configured to be slidable in the front-rear direction together with the seat back 51. In this case, the seat frame 53 may be fixed to the seat bottom 52. In yet another example, the seat frame 53 may be fixed to the seat back 51 and the seat bottom 52 may be fixed to the seat back 51.

A conventional structure that the rear seat is foldable and the folded seat back is used as the cargo bed floor reduces the freedom in the shape and the size of the seat back. Specifically, in this structure, the seat back needs to be rectangular, limiting space for a head rest. The structure in vehicle 1 in which the forward movement of the seat back 51 expands the capacity of the cargo bed 40 can increase the freedom of the shape and the size of the seat back 51. In the example of the vehicle 1, the seat back 51 includes, in the upper part of the seat back 51, the head rest 51b having a smaller width than that of the back rest portion 51a. In addition, the seat back 51 is curved such that the edge portions 51e in the right-left direction are located further forward than the middle portion 51f. The seat frame 53 is fixed, for example, to the back of the middle portion 51f of the seat back 51.

The seat back 51 includes a cushion portion 51c (see FIG. 7) on the front surface thereof. The structure in the vehicle 1 in which the forward movement of the seat back 51 expands the capacity of the cargo bed 40, prevents cargo in the cargo bed floor 43 from soiling the cushion portion 51c when the seat back 51 moves forward as shown in FIG. 10.

The seat frame 53 includes a locking mechanism 54 for fixing the position of the seat frame 53 in the usable state and in the unusable state. The position of the seat frame 53 in the usable state is hereinafter referred to as the "rear end position". The position of the seat frame 53 in the unusable state is hereinafter referred to as the "front end position". As shown in FIG. 8, in the example of the vehicle 1, a front rod 45A is located between the front portions of the right and left guide rails 44 and is fixed to the upper side of the cargo bed floor 43. Also, a rear rod 45B (see FIG. 10) is located between the rear portions of the right and left guide rails 44 and is fixed on the upper side of the cargo bed floor 43. The locking mechanism 54 includes a hook that is caught on the rods 45A and 45B to fix the position of the seat frame 53 and an operating member for the operator to release the engagement between the hook and the rods 45A and 45B. When the hook is caught on the rear rod 45B, the seat frame 53 is fixed to the rear end position shown in FIG. 6. When the hook of the lock mechanism 54 is caught on the front rod 45A, the seat frame 53 is fixed to the front end position shown in FIG. 11. When the engagements between the hook and the rods 45A, and 45B are released by operating the operating member of the lock mechanism 45, the seat frame 53 is allowed to slide forward or rearward. In an example, the seat frame 53 is allowed to be fixed only at these two positions and is not allowed to be fixed at a middle position. The structure of the lock mechanism 54 may be changed as long as the seat frame 53 is allowed to be fixed to the rear end position and the front end position.

[Fixing Structure Between Cargo Bed Frame and Guide Rail]

As mentioned above, the guide rails 44 are fixed to the cargo bed frame 20C. As shown in FIG. 9, the cargo bed frame 20C includes the right and left floor support portions 24 and the floor cross portions 22B and 22D fixed to the right and left floor support portions 24. The floor cross portion 22D is spaced away from the floor cross portion 22B. The guide rails 44 extends between the floor cross portions 22B and 22D. The front end and the rear end of the guide rails 44 are fixed to the floor cross portions 22B and 22D, respectively.

As described above, both ends of the floor cross portion 22B are respectively connected to the extending portions 21 provided at the right end and the left end of the main body frame 20. As shown in FIG. 5A, in the example of the vehicle 1, both ends of the floor cross portion 22B are connected to the rear vertical portions 21C of the main body frame 20. Accordingly, the floor cross portion 22B improves the strength for supporting the rear seat 50. In the example of the vehicle 1, both ends of the rear floor cross portion 22D are not connected to the extending portion 21 of the main body frame 20. Alternatively, both ends of the floor cross portion 22D may be connected to, for example, side wall extending portions 21D, each constituting a portion of the extending portion 21 via a bracket extending in the vertical direction. As shown in FIG. 9, the floor support portions 24 extend rearward beyond the floor cross portion 22D and the rear ends of the guide rails 44. This allows the cargo bed floor 43 to include the rear area A2 located behind the rear ends of the guide rails 44. The length in the front-rear direction of the area where the guide rails 44 are located is larger than the length in the front-rear direction of the rear area A2.

Figure 12:
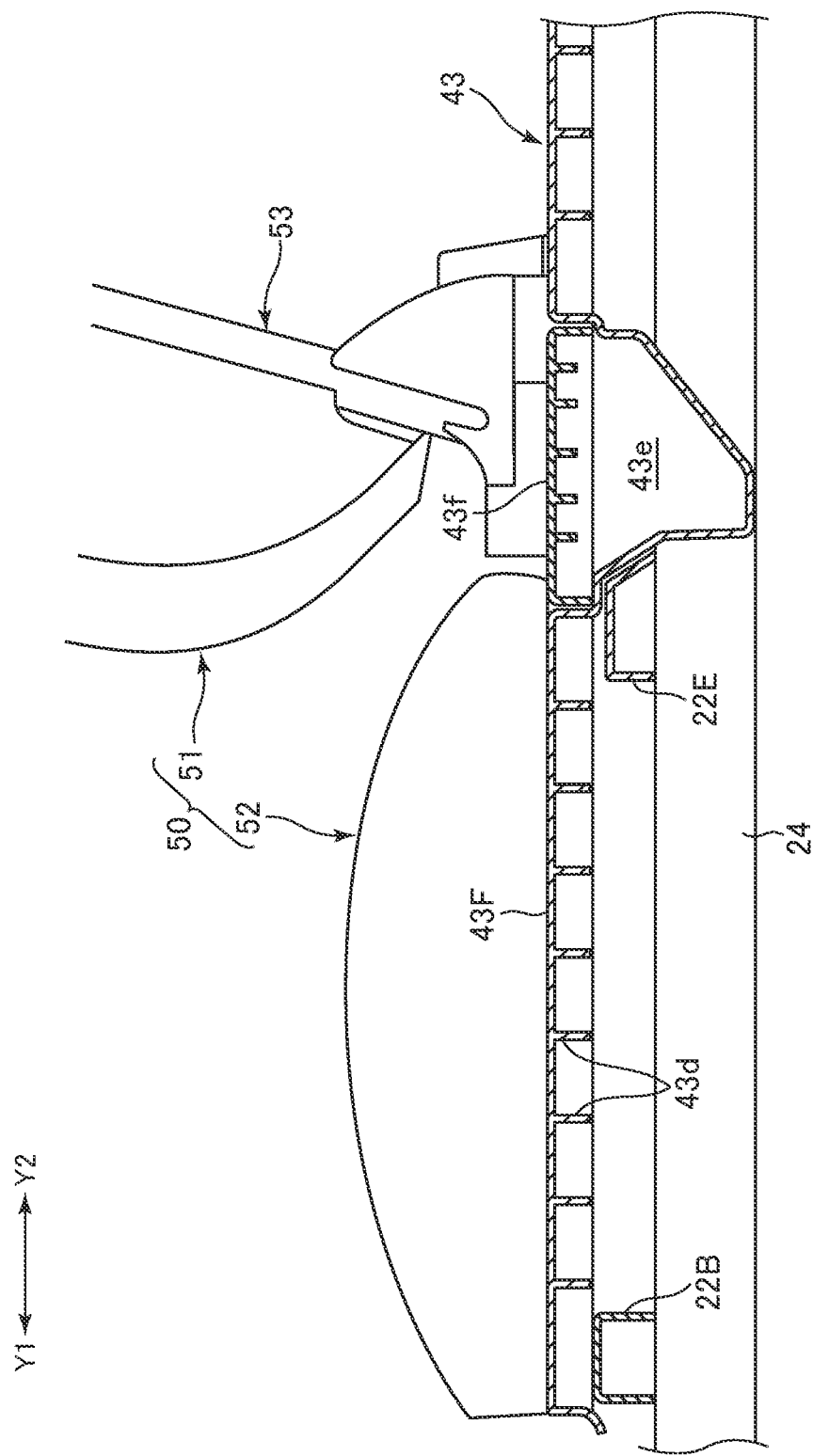
FIG. 12 is a cross-sectional view taken along the line XII-XII indicated in FIG. 7.

FIG. 12 is a cross-sectional view taken along a line XII-XII shown in FIG. 7. FIG. 13 is a cross-sectional view taken along a line XIII-XIII shown in FIG. 10. As shown in FIG. 13, the floor panel 43F has a plurality of concave portions 43b and a plurality of convex portions 43c each extending in the front-rear direction and aligned in the right-left direction (the concave portions 43b and the convex portions 43c are not shown in FIG. 7 and FIG. 10). As shown in FIG. 12, a plurality of ribs 43d are formed on the lower surface of the floor panel 43F and aligned in the front-rear direction. The concave portions 43b, the convex portions 43c, and the ribs 43d improve the rigidity of the floor panel 43F. In the example of the vehicle 1, the ribs 43d are formed on the lower side of the convex portions 43c.

The guide rails 44 fit into the concave portions 43b and the convex portions 43c. When the rear seat 50 is in the unusable state and cargo is placed behind the rear seat 50, this structure prevents the guide rails 44 from interfering with the cargo. In the example of the vehicle 1, as shown in FIG. 13, the guide rail 44 is located inside a concave portion 43b. The guide rail 44 includes a bottom portion 44a, side walls 44b, and a flange 44c. The bottom portion 44a is fixed to the bottom of the concave portion 43b. The guided portion 53b of the seat frame 53 is caught in the flange 44c. The shape of the guide rail 44 is not limited to the example in the vehicle 1. For example, the guide rail 44 may be formed so as to cover a convex portion 43c.

As described above, the cargo bed floor 43 includes the rear area A2 located behind the rear ends of the guide rails 44. The concave portions 43b, the convex portions 43c, and the ribs 43d are formed in the rear area A2. That is, the concave portions 43b and the convex portions 43c extend rearward beyond the rear ends of the guide rails 44.

[Seat Bottom]

As described above, the seat bottom 52 in the example of the vehicle 1 is allowed to move independently of the seat back 51. In the example of the vehicle 1, the seat bottom 52 is arranged at the standing position when the rear seat 50 is in the unusable state (see FIG. 8). More specifically, the seat bottom 52 is arranged such that its lower surface is substantially vertical. This structure enables the range of movement of the seat back 51 to easily increase in the front-rear direction.

The area A4 shown in FIG. 6 is an area where the seat bottom 52 is located when the rear seat 50 is in the usable state (this area A4 is Hereinafter referred to as the "seat bottom area"). The seat bottom area A4 is a range defined by the front edge 52c and the rear edge 52b of the seat bottom 52. When the rear seat 50 is in the usable state, the lower end L of the seat back 51 is located further rearward than the seat bottom area A4. As shown in FIG. 11, when the rear seat 50 is in the unusable state, the seat bottom 52 recedes from the seat bottom area A4 and then the lower end L of the seat back 51 is located in the seat bottom area A4.

In the example of the vehicle 1, as shown in FIG. 11, when the rear seat 50 is in the unusable state, the lower end L of the seat back 51 moves to the front half area within the seat bottom area A4. The front half area of the seat bottom area A4 means an area defined further forward than the center C1 in the front-rear direction of the seat bottom area A4. That is, the lower end L of the seat back 51 moves forward beyond the center C1 of the seat bottom area A4 in the front-rear direction. As described here, a large movable range is secured for the seat back 51 in the example of the vehicle 1. The movable range of the seat back 51 is not limited to the example of the vehicle 1. That is, the lower end L of the seat back 51 may be located rearward of the center C1 when the rear seat 50 is in the unusable state.

As shown in FIG. 10, in the example of the vehicle 1, the rear ends of the guide rails 44 are located further rearward than the center C2 in the front-rear direction of the cargo bed floor 43. When the rear seat 50 is in the usable state, the lower end L of the seat back 51 is located in an area defined behind the center C2 of the cargo bed floor 43. The front ends of the guide rails 44 are located further forward than the center C2 of the cargo bed floor 43. Therefore, when the rear seat 50 is in the unusable state, the lower end L of the seat back 51 is located in the area ahead of the center C2 of the cargo bed floor 43. Unlike the vehicle 1, if the length of the cargo bed floor 43 in the front-rear direction is sufficiently large, the lower end L of the seat back 51 may be located further forward than the center C2 of the cargo bed floor 43 even when the rear seat 50 is in the usable state.

In the example of the vehicle 1, as shown in FIG. 11, when the rear seat 50 is in the unusable state, the seat bottom 52 and the seat back 51 partially overlap in a side view of the vehicle body. Specifically, the bottom surface of the seat bottom 52 is positioned between the edges 51e in the right-left direction of the seat back 51, and at least the front ends of the edges 51e overlap with the seat bottom 52 (in this description, the "bottom surface" of the seat bottom 52 means a surface that faces downward when the rear seat 50 is in the usable state). Unlike the example of the vehicle 1, the edges 51e of the seat back 51 may be located behind the seat bottom 52 when the rear seat 50 is in the unusable state.

In the example of the vehicle 1, when the rear seat 50 is in the unusable state, the seat bottom 52 is arranged at the standing position and the seat surface 52a of the seat bottom 52 faces forward. This orientation of the seat back 51 prevents cargo placed on the cargo bed floor 43 from soiling the seat surface 52a when the rear seat 50 is in the unusable state. Also, when the rear seat 50 is in the unusable state, the seat back 51 supported by the seat frame 53 is located behind the seat bottom 52. As a result, the seat back 51 prevents a large force from being applied to the seat bottom 52 from cargo placed on the cargo bed floor 43. More specifically, the seat back 51 prevents a large force from being applied to the support mechanism (a pivot shaft 46a and brackets 46A, 46B connected to the pivot shaft 46a) of the seat bottom 52.

As shown in FIG. 11, when the rear seat 50 is in the unusable state, at least a part of the seat bottom 52 is located further forward than the cargo bed floor 43. More specifically, at least a part of the seat bottom 52 is located further forward than the front edge 43a of the cargo bed floor 43. As a result, when the rear seat 50 is in the unusable state, the arrangement of the seat bottom 52 effectively utilizes the space secured between the cargo bed 40 and the front seat 4 (this space is for the rider to put his legs). This structure enables the seat back 51 to have a large movable range thereof. As shown in FIG. 10, in the example of the vehicle 1, when the rear seat 50 is in the unusable state, the side surface 52d of the seat bottom 52 is located further forward than the front edge 43a of the cargo bed floor 43.

As shown in FIG. 11, in the example of the vehicle 1, when the rear seat 50 is in the unusable state, the side surface 52d of the seat bottom 52 is located further forward than the bent portion between the rear vertical portion 21C and the side wall extending portion 21D of the main body frame 20. More specifically, when the rear seat 50 is in the unusable state, the entire seat bottom 52 is located further forward than the bent portion between the rear vertical portion 21C and the side wall extending portion 21D.

As described above, the seat bottom 52 is allowed to move to the standing position at which the seat bottom 52 is arranged in the unusable state of the rear seat 50 and to a laid position (a position shown in FIG. 6) at which the seat bottom 52 is arranged in the usable state of the rear seat 50. In the example of the vehicle 1, the lower surface of the seat bottom 52 is supported by the guide rails 44 when the seat bottom 52 is in the laid position. That is, the lower surface of the seat bottom 52 is in contact with the upper surface of the guide rails 44. This structure does not employ a dedicated member for supporting the seat bottom 52. Therefore, this structure avoids an increase in the number of components (parts) while increasing the support strength of the seat bottom 52.

As shown in FIG. 8, in the example of the vehicle 1, the seat bottom 52 is supported by a hinge mechanism and thus is movable to the standing position and the laid position around the pivot shaft 46a of the hinge mechanism. The pivot shaft 46a is supported at the foremost position of the cargo bed frame 20C. When the seat bottom 52 is in the standing position, the structure described above enables a large area to be secured behind the seat bottom 52, that is, to be secured for the seat back 51.

As described above, the cargo bed frame 20C in the example of the vehicle 1 includes a floor cross portion 22B (see FIG. 9) located at the foremost position of the cargo bed frame 20C. As shown in FIG. 6, the pivot shaft 46a is attached to the floor cross portion 22B via a bracket 46A. The bracket 46A is attached to the front surface of the floor cross portion 22B. This arrangement of the bracket 46A enables the seat bottom 52 in the standing position to be located closer to the front seat 4.

As shown in FIG. 8, the seat bottom 52 is connected to the pivot shaft 46a via a bracket 46B. The bracket 46B is attached to, for example, the bottom surface of the seat bottom 52. When the rear seat 50 is in the usable state, the pivot shaft 46a is located further forward than the front edge 52c of the seat bottom 52 (see FIG. 6). This arrangement enables the seat bottom 52 in the standing position to be located closer to the front seat 4. The position and the support structure of the pivot shaft 46a is not limited to the example of the vehicle 1 and may be changed.

The movement of the seat bottom 52 and the orientation and the position of the seat back 51 in the unusable state are not limited to the example of the vehicle 1. For example, the seat bottom 52 and the seat back 51 may be configured to move integrally in the front-rear direction. In this case, when the rear seat 50 is in the unusable state, the seat bottom 52 may be placed in the laid position and most of the seat bottom 52 may be located further forward than the front edge 43a of the cargo bed floor 43. As a result, the seat back 51 may be located in the front half area of the seat bottom area A4.

In yet another example, when the rear seat 50 is in the unusable state, the seat bottom 52 may be configured to stand along the side wall 41 of the cargo bed 40 and the seat bottom 52 may be located in the front half area of the seat bottom area A4.

In yet another example, a hinge mechanism that allows movement of the seat bottom 52 may be arranged in the rear portion of the seat bottom 52. In addition, the seat bottom 52 may be connected to the seat back 51 via the hinge mechanism. In this structure, the seat bottom 52 rotates so that the rear end of the seat bottom 52 goes under the seat bottom 52, and the rotation moves the seat bottom 52 to the standing position. In this case, the seat back 51 and the seat bottom 52 may be integrally moved in the front-rear direction.

As described above, the roll cage 30 includes a cross portion 32D (see FIG. 5B) extending between the right and left rear vertically extending portions 31C. As shown in FIG. 2, when the rear seats 50 are in the usable state, the cross portion 32 D is located behind the seat backs 51 to support the seat backs 51. In the example of the vehicle 1, when the rear seats 50 are in the usable state, the lateral portions 32b of the cross portion 32D are located behind the head rests 51b, each of which is the upper portion of the seat back 51, and support the head rests 51b. When the rear seat 50 is in the usable state and no force is applied to the seat back 51 in the rearward direction, a clearance may be made between the lateral portion 32b of the cross portion 32D and the head rest 51b, or alternatively the lateral portion 32b may be in contact with the head rest 51b.

[Seat Belt Mechanism]

The rear seat 50 is provided with a seat belt mechanism. As shown in FIG. 3, the seat belt mechanism includes a retractor 56b for accommodating a part of the belt to adjust the length of the belt. In the example of the vehicle 1, the retractor 56b is located below the cross portion 32D and is attached to the rear vertically extending portion 31C of the roll cage 30 (see FIG. 5B). The seat belt mechanism also includes a guide anchor 56a for guiding the belt extending out of the retractor 56b. In the example of the vehicle 1, the guide anchor 56a is attached to the cross portion 32D. Specifically, the guide anchor 56a is attached to the end of the cross portion 32D. The belt extends from the retractor 56b toward the guide anchor 56a and then extends downward from the guide anchor 56a. Employing the cross portion 32D as a member for supporting the guide anchor 56a contributes to a reduction in the number of components (parts).

As shown in FIG. 7, the cargo bed floor 43 is provided with buckles 56d. When using the seat belt mechanism, a joint (tongue plate) provided to the belt extending from the guide anchor 56a is connected to the buckle 56d. The Buckles 56d are located between the right and left rear seats 50. As shown in FIG. 5A, the end of the buckle 56d is fixed to the cargo bed frame 20C, for example. In the example of the vehicle 1, the end of the buckle 56d is fixed to the floor cross portion 22E bridged over the floor support portions 24.

The cargo bed floor 43 has an accommodating portion formed thereon for accommodating the buckles 56d. Specifically, as shown in FIG. 12, a recess 43e is formed in the floor panel 43F constituting the cargo bed floor 43 and functions as the accommodating portion for accommodating the buckles 56d. A lid 43f for closing the recess 43e is attached to the cargo bed floor 43. The upper surface of the lid 43f is located at the same height as the floor panel 43F in a state in which the lid 43f closes the recess 43e.

The present invention is not limited to the above-described embodiments. It is obvious to those skilled in the art that there are other embodiments that can obtain similar functions and results. The claims cover the substantially equivalent other embodiments.

What is claimed is:

1. A vehicle comprising:
   right and left front wheels;
   right and left rear wheels;
   a body frame including a cross portion;
   right and left front seats mounted on the body frame;
   a cargo bed located rearward of the right and left front seats, including a cargo bed floor that has a convex portion and a concave portion, each of the convex portion and the concave portion extending in the front-rear direction;
   a guide rail disposed on the cargo bed and fitting into the concave portion, and including a bottom portion, a side wall, and a flange; and
   a rear seat including a seat frame that is attached on the flange of the guide rail and is slidable in a front-rear direction along the guide rail,
   wherein the bottom portion is located inside the concave portion of the cargo bed and is fixed to the cross portion of the body frame, and
   wherein the flange is located inside the concave portion of the cargo bed, and is located lower than the top of the convex portion of the cargo bed.

2. The vehicle according to claim 1, wherein
   the rear seat includes a seat bottom located in a bottom of the rear seat and a seat back located on a rear side of the seat bottom, and
   at least the seat back is fixed to the seat frame and slidable in the front-rear direction.

3. The vehicle according to claim 2, wherein
   the seat bottom is independently movable with respect to the seat back.

4. The vehicle according to claim 3, wherein
   the seat bottom is movable to a laid position at which the seat bottom allows a rider to sit thereon and is further movable to a standing position at which the seat bottom does not allow the rider to sit thereon.

5. The vehicle according to claim 4, wherein
   when the seat bottom is at the standing position, a seat surface of the seat bottom faces forward.

6. The vehicle according to claim 1, wherein
   the rear seat includes a seat bottom located in a bottom of the rear seat and a seat back located on a rear side of the seat bottom,
   the seat bottom is located in a space defined forward of the cargo bed in a state where the rear seat does not allow a rider to sit thereon.

7. The vehicle according to claim 3, wherein
   the seat bottom is movable around a pivot shaft to a laid position and to a standing position.

8. The vehicle according to claim 7, wherein
   the pivot shaft is located at a front end of the cargo bed.

9. The vehicle according to claim 3, wherein
   when the seat bottom is in a laid position at which the seat bottom allows a rider to sit thereon, the seat bottom is located on the guide rail.

10. The vehicle according to claim 2, wherein
    the seat back includes a back rest portion which is a lower portion of the seat back for supporting a rider's back, and includes a head rest portion which is an upper portion of the seat back for supporting the rider's head, and
    both of the head rest portion and the back rest portion are integrally movable in the front-rear direction along the guide rail.

11. The vehicle according to claim 1, wherein
    the rear seat is movable to a first state, in which the rear seat allows a rider to sit thereon, and the rear seat is movable to a second state, in which the rear seat does not allow the rider to sit thereon, and
    when an area in which the seat bottom is located, when the rear seat is in the first state, is defined as a seat bottom area, at least a part of the seat back may be located in a front part of the seat bottom area in a state where the rear seat is in the second state.

12. The vehicle according to claim 1, wherein
    the rear seat is provided with a seat belt mechanism including a belt and a buckle configured to be connected to the belt, and
    the cargo bed has an accommodating portion that accommodates the buckle.

13. The vehicle according to claim 12, wherein
    the accommodating portion is concave, and
    the cargo bed includes a lid for closing the accommodating portion.

14. The vehicle according to claim 1, wherein
    the concave portion and the convex portion extend rearward beyond the guide rail.

15. The vehicle according to claim 1, wherein the guide rail is located inside the concave portion.

16. The vehicle according to claim 15, wherein the guide rail is located lower than the top of the convex portion.

17. A vehicle comprising:
    right and left front wheels;
    right and left rear wheels;
    a body frame including a cargo bed frame;
    right and left front seats mounted on the cargo bed frame;
    a cargo bed located rearward of the right and left front seats, including a cargo bed floor that has a convex portion and a concave portion, each of the convex portion and the concave portion extending in the front-rear direction;
    a guide rail disposed on the cargo bed and extending along at least one of the concave portion and the convex portion;
    a rear seat including a seat bottom, and a seat frame that is attached on the guide rail and is slidable in a front-rear direction along the guide rail; and a bracket supporting the seat bottom via pivot shaft and attached to the front face of the front-most portion of cargo frame, wherein a position at which the bracket is fixed to the cargo frame is positioned lower than an upper portion of the guide rail.

18. The vehicle according to claim 17, wherein the guide rail fits into the at least one of the concave portion and the convex portion.

19. The vehicle according to claim 17, wherein the guide rail is located inside the concave portion.

20. The vehicle according to claim 19, wherein the guide rail is located lower than the top of the convex portion.

\* \* \* \* \*